(12) United States Patent
Hamada et al.

(10) Patent No.: US 7,875,375 B2
(45) Date of Patent: Jan. 25, 2011

(54) BATTERY MODULE, BATTERY PACK, AND METHOD FOR PRODUCING THE BATTERY MODULE

(75) Inventors: Shinji Hamada, Toyohashi (JP); Toyohiko Eto, Toyota (JP); Yoshitaka Sunagawa, Toyohashi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1025 days.

(21) Appl. No.: 11/659,320

(22) PCT Filed: Jul. 15, 2005

(86) PCT No.: PCT/JP2005/013533

§ 371 (c)(1),
(2), (4) Date: Feb. 5, 2007

(87) PCT Pub. No.: WO2006/013743

PCT Pub. Date: Feb. 9, 2006

(65) Prior Publication Data

US 2009/0061289 A1     Mar. 5, 2009

(30) Foreign Application Priority Data

Aug. 5, 2004  (JP) ............................. 2004-229613
Mar. 8, 2005  (JP) ............................. 2005-064250

(51) Int. Cl.
*H01M 2/12* (2006.01)

(52) U.S. Cl. ............................. 429/53; 429/87; 429/96; 429/99; 429/100; 29/623.2

(58) Field of Classification Search ................... 429/53, 429/87–88, 96, 99, 100; 29/623.2
See application file for complete search history.

(56) References Cited

FOREIGN PATENT DOCUMENTS

| EP | 0 570 703 | 11/1993 |
|---|---|---|
| EP | 0 638 951 A2 | 2/1995 |
| EP | 1 098 377 A1 | 5/2001 |
| JP | 2001-110377 | 4/2001 |
| JP | 2002 151025 | 5/2002 |
| JP | 2003-229102 | 8/2003 |
| JP | 2004-39582 | 2/2004 |

*Primary Examiner*—Gregg Cantelmo
(74) *Attorney, Agent, or Firm*—Finnegan, Henderson, Farabow, Garrett & Dunner, LLP

(57) ABSTRACT

An inexpensive battery pack including a battery module wherein a safety valve is provided for each cell in which battery pack gas leakage can be prevented. A battery pack 100 has a plurality of battery modules 110 each including a plurality of cells 120 respectively provided with a safety valve 123. The plurality of cells 120 included in each battery module 110 are arranged such that safety-valve mounting walls 121a are oriented in the same direction. Each battery module 110 comprises a gas duct member 130 covering all the safety valves 123 of the cells 120 included therein and forming a gas discharge path 131 between the gas duct member 130 and the safety-valve mounting walls 121a, and a sealing member 160 for hermetically sealing the gaps between each cell case 121 and the gas duct member 130.

24 Claims, 19 Drawing Sheets

BATTERY MODULE, BATTERY PACK, AND METHOD FOR PRODUCING THE BATTERY MODULE

TECHNICAL FIELD

The present invention relates to a battery module including a plurality of cells, a battery pack comprising such battery module, and a method for producing the battery module. In particular, the present invention relates to a battery module provided with a safety valve in each cell case, a battery pack comprising such battery module, and a method for producing the battery module.

BACKGROUND ART

Heretofore a battery pack comprising a plurality of cells each having a safety valve has been known. The safety valve works to release gas to the outside of the cell when internal pressure of the cell exceeds a fixed level due to the gas (hydrogen gas or the like) generated, during charge/discharge. Such battery pack is disclosed in e.g. Patent Document 1. In the battery pack disclosed as an embodiment of the invention in Patent Document 1, a plurality of battery modules (cells), each having a safety valve, is arranged in rows in parallel. Each safety valve is connected with a gas discharge tube to be connected to an external exhaust part. Specifically, the gas discharge tube has a plurality of outlet coupling parts each of which is fit in a gas outlet port of each safety valve for connection with the safety valve. In a battery pack mentioned as a related art in Patent Document 1, a T-shaped joint is placed in the gas outlet port of the safety valve so that both ends of the joint are sequentially connected through gas discharge tubes, thereby forming a gas discharge line to be connected to an external exhaust part.

In the above battery packs, when the internal pressure of the battery module(s) (cell(s)) exceeds the fixed level due to the gas generated during charge/discharge, each safety valve operates to release the gas through the gas outlet port into the gas discharge tube (the gas discharge line). Then, the gas is discharged out of the battery pack through the gas discharge tube (the gas discharge line) and the external exhaust part. In this way, the gas released through each safety valve is collected to be discharged together outside, thus improving measures for safety, for example, to prevent the gas from catching fire.

Patent Document 1: Japanese unexamined patent publication No. 2001-110377

DISCLOSURE OF INVENTION

Problems to be Solved by the Invention

In the conventional battery packs, however, each cell is provided with the outlet coupling part, the T-shaped joint, or the like as mentioned above for connection between the gas discharge tube and the safety valve. This would cause high production costs. Further, a connection nozzle of such coupling part, joint, etc. is likely to cause gas leakage.

The present invention has been made in view of such circumstances and relates to a battery module provided with a safety valve in each cell and particularly has a purpose to provide an inexpensive battery module capable of preventing gas leakage, a battery pack comprising such battery module, and a method for producing the battery module.

Means for Solving the Problems

To achieve the above objects, the present invention provides, a battery module including a plurality of cells each of which is provided with a safety valve on a safety-valve mounting wall of a cell case, wherein the plurality of cells included in the battery module are arranged so that the safety-valve mounting walls are oriented in the same direction, and the battery module further includes: a gas duct member which covers all the safety valves of the plurality of cells included in the battery module, thereby forming a gas discharge path between the gas duct member and the safety-valve mounting walls; and a seal member for hermetically sealing between at least each cell case and the gas duct member.

In the conventional battery packs, as mentioned above, the gas discharge path for allowing hydrogen gas to be released through the safety valve is formed by the connection nozzle connected to the safety valve and the gas discharge tube connected to this nozzle.

In the battery module of the present invention, on the other hand, the gas discharge path is formed between a gas duct covering all the safety valves of the cells included in the battery module and the safety-valve mounting wall of each cell. The gap between each cell case and the gas duct member is hermetically sealed by the seal member. With this structure, the need for the connection nozzle conventionally attached to each cell can be eliminated. Accordingly, the cell module can be provided at low cost and with enhanced reliability.

Here, the shape of a "cell" is not particularly limited and may be for example rectangular or cylindrical. Further, the "cell case" may be made of resin, metal, or in part of resin and in part of metal.

The plurality of cells included in the battery module has only to be arranged so that the safety-valve mounting walls are oriented in the same direction. The arrangement pattern may be selected appropriately. For instance, the cells may be arranged in a row or in vertical and horizontal rows. The single-row arrangement is preferable because respective cells can be cooled efficiently.

The "gas duct member" may be any structure capable of covering all the safety valves of the plurality of cells included in the battery module, thereby forming the gas discharge path between the gas duct member and the safety-valve mounting walls. The materials and shapes thereof are not particularly limited. For example, the gas duct member may be resin, metal, or ceramic. If the gas duct member is made of resin, particularly, it is suitable to achieve weight reduction of the battery module. The gas duct member has only to cover all the safety valves to form the gas discharge path between the gas duct member and the safety-valve mounting walls. Thus, it does not always have to cover the entire of the safety-valve mounting walls. It may be arranged to cover part of the safety-valve mounting walls.

The "seal member" may be any configuration if only it hermetically seals between at least each cell case and the gas duct member and its materials and shapes may not be limited in particular. For instance, a gap between each cell case and the gas duct member may be poured with adhesive or the like or be sealed by a sheet-like adhesive tape or a heat-shrinkable tube as mentioned later.

Furthermore, in the aforementioned battery module, preferably, the seal member fixes the gas duct member to each cell case.

According to the present invention, the seal member seals the gap between the gas duct member and each cell case and fixes the gas duct member to each cell case. It is therefore unnecessary to join the gas duct member to each cell case. The cell module can be provided at low cost accordingly.

In any one of the aforementioned battery modules, preferably, the seal member also hermetically seals a gap between the adjacent cell cases.

When the plurality of cells are simply arranged, a gap is likely to be generated between adjoining cell cases of the cells, which may cause leakage of hydrogen gas discharged through the safety valve. It is necessary to prevent such gap in some way; for example, by joining the cell cases to each other.

In the present invention, on the other hand, the seal member hermetically seals even the gap between the adjoining cell cases. By use of the seal member sealing the gap between the gas duct member and each cell case, the gap between the cell cases can be sealed readily and inexpensively.

In any one of the aforementioned battery modules, preferably, the seal member includes an adhesive tape attached to bridge across at least each cell case and the gas duct member to seal between them.

According to the present invention, the adhesive tape is used as the seal member and is attached to bridge across each cell case and the gas duct member to close the gap therebetween. This makes it possible to seal between each cell case and the gas duct member readily and inexpensively. Further, the use of the adhesive tape facilitates fixation of the gas duct member and the cell cases.

In any one of the aforementioned battery modules, preferably, the seal member is a heat-shrinkable tube in a shrunken state that surrounds the cell cases and the gas duct member and provides mutual pressure contact between the cell cases and the gas duct member.

According to the present invention, the heat-shrinkable tube is used as the seal member. This heat-shrinkable tube in a shrunken state surrounds each cell case and the gas duct member and holds them in pressure contact relation with each other. With this structure, it is also possible to seal between the cell cases and the gas duct member readily and inexpensively. Further, the use of the heat-shrinkage tube facilitates fixation of the gas duct member and the cell cases.

In any one of the aforementioned battery modules, preferably, each cell case is made of metal in at least part of a case surface, the seal member has electric insulation characteristics; and at least the metallic parts of the case surfaces of the plurality of cells included in the battery module are covered by the seal member.

If the case surface of a cell case is made of metal and exposed outside, current leakage may be caused due to surface condensation.

In the present invention, on the other hand, at least a part of the case surface of the cell case is made of metal, and at least this metallic part of the case surface is covered by the seal member having an electrical insulation property. Accordingly, the metallic surface of the cell case is unexposed, surely preventing current leakage which would be caused by surface condensation.

In any one of the aforementioned battery modules, preferably, the seal member is a sheet form having a thickness of 0.5 mm or less.

In the case where the seal member is a sheet type being thick, cooling characteristics (heat release characteristics) of the cell will decrease. To be more specific, the thickness of the seal member exceeding 0.5 mm may have an influence on the cooling characteristics.

In the present invention, on the other hand, the seal member is formed as a sheet having a thickness of 0.5 mm or less. Thus, the cell can provide sufficient cooling characteristics.

In any one of the aforementioned battery modules, preferably, each cell case is of a rectangular parallelepiped shape, in which the safety-valve mounting wall is rectangular, and the plurality of cells included in the battery module are arranged so that respective side walls each including a short side of the safety-valve mounting wall and being perpendicular to the safety-valve mounting wall face each other.

The arrangement pattern of the cells may be selected appropriately as mentioned above; however, some patterns may deteriorate the cooling characteristics of the cell.

In the present invention, on the other hand, each cell case is of a rectangular parallelepiped shape having the rectangular safety-valve mounting wall. The cells are arranged in a row so that respective side walls each including the short side of the safety-valve mounting wall and being perpendicular to the safety-valve mounting wall are arranged side by side. In this configuration of the cells arranged in a row, the narrow side walls face each other, while any cell included in the same battery module does not exist along the wide side walls each including a long side of the safety-valve mounting wall and being perpendicular to the safety-valve mounting wall. This makes it possible to efficiently cool each cell through the wide side wall. The cooling characteristics of each cell and hence the battery module can be further enhanced.

Further, in another aspect, the present invention provides a battery module comprising: a cell group in which a plurality of cells each provided with a safety valve in a safety-valve mounting wall of a cell case is arranged in a row so that the safety-valve mounting walls are oriented in the same direction; a gas duct member placed over the safety valves of the cell group to cover them, thereby forming a gas discharge path between the gas duct member and the safety-valve mounting walls; a first side cover that covers the cell group and the gas duct member from one ends thereof in a cell arrangement direction; a second side cover that covers the cell group and the gas duct member from the other ends thereof in the cell arrangement direction and has a gas discharge port communicated with the gas discharge path; and a seal member that is placed between the first side cover and the second side cover and hermetically surrounds, in a sleeve shape, the cell group and the gas duct member, the seal member including a first open end portion at one end which is hermetically fixed to around the first side cover and a second open end portion at the other end which is hermetically fixed to around the second side cover.

As described above, heretofore, the gas discharge path for discharge of gas going out of the safety valve is formed by the connection nozzle connected to the safety valve and the gas discharge tube connected to this nozzle.

In the present invention, on the other hand, the gas discharge path is formed between the gas duct member and the safety-valve mounting wall of each cell by the gas duct member covering each safety valve of the cell group. The second side cover is arranged on one ends of the cell group and the gas duct member in the cell arrangement direction. Further, the gas discharge port communicated with the gas discharge path is formed in this second side cover. Accordingly, the gas released through the safety valve is discharged to the outside of the module through the gas discharge port. Thus, the need for the connection nozzle or the like conventionally attached to each cell can be eliminated and a gas discharge path can inexpensively be formed.

In the present invention, furthermore, the first side cover is also disposed on the other ends of the cell group and the gas duct member in the cell arrangement direction. Additionally, the sleeve-shaped seal member is provided between the first and second side covers to hermetically surround the cell group and the gas duct member. This seal member is hermetically fixed to the first and second side covers respectively so that the first open end portion thereof surrounds the first side cover and the second open end portion surrounds the second side cover. This configuration makes it possible to hermetically seal the entire battery module, preventing the gas released through the safety valve from leaking from any portion other than the gas discharge port. Further, this can prevent the electrolyte even if leaks from the cell from leaking to the outside of the module.

Here, the "cell group" has only to be configured such that the cells included therein are arranged in a row with respective safety-valve mounting walls being oriented in the same direction. The connection patterns or the like may be selected appropriately. The terms "cell", "cell case", and "gas duct member" are as described above.

The "first side cover" has only to cover the cell group and the gas duct member from their one ends in the cell arrangement direction. The materials, shapes, and others thereof are not particularly limited. The "second side cover" has only to cover the cell group and the gas duct member from their other ends in the cell arrangement direction and include the gas discharge port communicated with the gas discharge path. The materials, shapes, and others thereof are not particularly limited.

The "seal member" in the present invention has only to meet the above requirements and its materials and others are not particularly limited. The way of fixing the seal member to the first and second side covers is also not particularly limited. For instance, the fixation may be carried out by use of adhesive, by welding, or by a combination of adhesion and welding.

In the aforementioned battery module, preferably, the first side cover, the second side cover, and the seal member are made of resin respectively, the first open end portion of the seal member is hermetically fixed by welding to the first side cover, and the second open end portion of the seal member is hermetically fixed by welding to the second side cover.

The seal member may also be fixed to the first and second side covers by use of the adhesive as described above. However, when the electrolyte leaks from the cell and penetrates into such fixed portion, the adhesive is likely to change in quality, deteriorating adhesive force, because the electrolyte is generally alkaline. This may cause the seal member to come unstuck from the first and second side covers.

In the present invention, on the other hand, the seal member and the first and second side covers are made of resin and the seal member is welded to the first and second side covers respectively. Hence, even when the electrolyte having leaked from the cell reaches the fixed portion, the seal member is unlikely to come unstuck therefrom, thus achieving improved sealing characteristics. In the present invention, further, the seal member has only to be hermetically fixed by welding to the first and second side covers respectively. They may hermetically be fixed by only welding or by additional welding on the adhered portion.

In the aforementioned battery module, preferably, the first open end portion of the seal member is welded to the first side cover without interposing adhesive, and the second open end portion of the seal member is welded to the second side cover without interposing adhesive.

The seal member may be fixed to the first and second side covers by a combination of adhesion and welding as mentioned above. However, there may be a case where an attempt to additionally weld the adhered portion leads to an insufficient welding result because of influence of the adhesive existing in the adhered portion.

In the present invention, on the other hand, the seal member is fixed by welding to the first and second side covers without interposing adhesive. It is therefore possible to reliably weld the seal member to the first and second side covers respectively with further enhanced sealing characteristics in those portions.

In any one of the aforementioned battery modules, preferably, the seal member is formed of a rectangular sheet-like seal member wrapped in a sleeve shape around the cell group and the gas duct member so that a first end portion along a first edge and a second end portion along a second edge opposite the first edge overlap each other, and the first end portion and the second end portion are hermetically fixed to each other.

According to the present invention, the seal member is formed of the rectangular sheet-like seal member in a sleeve-like shape wrapped around the cell group and the gas duct member so that the first end portion and the second end portion are hermetically fixed to each other. This configuration can easily provide a sleeve-shaped seal member hermetically surrounding the cell group and the gas duct member. The way of fixing the first and second end portions is not limited to particular one. For instance, the fixation may be performed by use of adhesive, by welding, or by a combination of adhesion and welding.

In the aforementioned battery module, preferably, the sheet-like seal member is made of resin, and the seal member is arranged such that the first end portion and the second end portion of the sheet-like seal member are hermetically fixed to each other by welding.

The first and second end portions may be fixed by use of adhesive as mentioned above. However, if the electrolyte leaks from the cell and penetrates into the fixed portion, the adhesive is likely to change in quality, deteriorating adhesive force, because the electrolyte is generally alkaline. This may cause the fixed portion to come unstuck.

In the present invention, on the other hand, the sheet-like seal member is made of resin and the first and second end portions are fixed by welding. Accordingly, even when the electrolyte having leaked from the cell reaches the fixed portion, the fixed portion is unlikely to come unstuck, thus achieving improved sealing characteristics. In the present invention, further, the first and second end portions have only to be hermetically fixed by welding, and may be hermetically fixed by only welding or by additional welding to the adhered portion.

In the aforementioned battery module, preferably, the first end portion and the second end portion of the seal member are welded to each other without interposing adhesive.

The first and second end portions of the seal member may be fixed by a combination of adhesion and welding as mentioned above. However, there may be a case where an attempt to additionally weld the adhered portion may lead to an insufficient welding result because of influence of the adhesive existing in the adhered portion.

In the present invention, on the other hand, the first and second end portions are fixed by welding without interposing adhesive. It is therefore possible to reliably weld the first and second end portions to each other with further enhanced sealing characteristics in this portion.

In any one of the aforementioned battery modules, preferably, the seal member is in close contact with each cell case of the cell group.

According to the present invention, the seal member is in close contact with each cell case of the cell group. This close contact of the seal member can prevent defects such as breakage of the seal member in the handling of the battery module. Further, the heat release characteristics can be improved and thus each cell can efficiently be cooled.

In any one of the aforementioned battery modules, preferably, the seal member is unfixed to at least a first-side-cover-side portion of the gas duct member, the portion extending across a first predetermined range from the first side cover in the cell arrangement direction, and a second-side-cover-side portion of the gas duct member, the portion extending across a second predetermined range from the second side cover in the cell arrangement direction.

Considering that the gas duct member has to be reliably fixed to the cell group, it is preferable to entirely fix the seal member and the gas duct member. However, when the gas duct member is made of resin and the cell case is made of metal, for example, in which the coefficient of thermal expansion of the gas duct member is larger than that of the cell case, the gas duct member will largely shrink whereas the cell case will not so shrink under low temperatures, e.g. −40° C. Hence, no gap will be generated between the first side cover and the cell group and between the second side cover and the cell group, whereas a gap will be generated between the first side cover and the gas duct member and the second side cover and the gas duct member. When the seal member is entirely fixed to the gas duct member, therefore, the portion of the sheet member corresponding to the gap may be stretched strongly, which is likely to cause cracks or the like in this portion. In particular, under low temperatures, the seal member itself becomes hard, which is likely to be cracked.

In the present invention, on the other hand, the seal member is not fixed to at least the first-side-cover-side portion and the second-side-cover-side portion of the gas duct member. Specifically, at least the first-side-cover-side portion and the second-side-cover-side portion are allowed to freely move without being restricted by the seal member. Accordingly, even when the gas duct member shrinks under low temperatures, causing gaps between the gas duct member and the first and second side covers, the portions of the seal member corresponding to the gaps will not receive so strong stretching stress. Consequently, it is possible to prevent defects such as cracks caused in the seal member corresponding to the gaps.

In any one of the aforementioned battery modules, preferably, the seal member is fixed to the gas duct member from one end to the other in the cell arrangement direction, and the gas duct member includes a plurality of sub gas-duct parts arranged in the cell arrangement direction.

If the seal member is fixed to the gas duct member from end to end, it is advantageous that the gas duct member can reliably be fixed to the cell group. However, as mentioned above, if the thermal expansion coefficient of the gas duct member is larger than that of the cell case, gaps will be generated between the first side cover and the gas duct member and between the second side cover and the gas duct member under low temperatures. Therefore the portion of the seal member corresponding to the gap may be stretched strongly, which is likely to cause cracks or the like in this portion.

In the present invention, on the other hand, the gas duct member is comprised of a plurality of sub gas-duct parts aligned in the cell arrangement direction. This configuration will allow the sub gas-duct parts to shrink separately even when the gas duct member thermally shrinks under low temperatures. Thus, a gap is generated between the sub gas-duct parts as well as between the gas duct member and the first or second side cover. This results in a relatively small gap between the gas duct member and the first or second side cover. Accordingly, the portion of the seal member corresponding to the gap will not receive so strong stretching stress and it is therefore possible to prevent defects such as cracks in the seal member corresponding to this gap.

Further, in another aspect, the present invention provides a battery pack comprising one or more battery modules set forth in any one of the above descriptions.

Comprising the inexpensive battery module capable of preventing gas leakage and electrolyte leakage, as mentioned above, the battery pack can be low in cost and high in reliability.

Further, in another aspect, the present invention provides a method for producing a battery module, comprising a sealing step of wrapping a rectangular sheet-like seal member having a first edge and a second edge and a third edge and a fourth edge around a yet-to-be-sealed battery module to hermetically seal it, the yet-to-be-sealed battery module comprising: a cell group in which a plurality of cells each provided with a safety valve in a safety-valve mounting wall of a cell case is arranged in a row so that the safety-valve mounting walls are oriented in the same direction; a gas duct member placed over the safety valves of the cell group to cover them, thereby forming a gas discharge path between the gas duct member and the safety-valve mounting walls; a first side cover that covers the cell group and the gas duct member from one ends thereof in a cell arrangement direction; a second side cover that covers the cell group and the gas duct member from the other ends thereof in the cell arrangement direction and has a gas discharge port communicated with the gas discharge path; and wherein the sealing step includes: placing the sheet-like seal member so that the first edge and the second edge extend along the cell arrangement direction; wrapping the sheet-like seal member around the yet-to-be-sealed battery module so that the second end portion along the second edge overlaps the first end portion along the first edge from outside while the third end portion along the third edge surrounds the first side cover and the fourth end portion along the fourth edge surrounds the second side cover; hermetically fixing the second end portion to the first end portion, forming the sheet-like seal member in a sleeve shape; hermetically fixing the third end portion to the first side cover; and hermetically fixing the fourth end portion to the second side cover.

The battery module according to the manufacturing method of the present invention is arranged such that the gas duct member covering each safety valve of the cell group forms the gas discharge path between the gas duct member and the safety-valve mounting wall of each cell. Further, the second side cover is disposed in one ends of the cell group and the gas duct member in the cell arrangement direction and is formed with the gas discharge port communicated with the gas discharge path, thereby discharging gas released through the safety valve to the outside of the module through the gas discharge port. Further, the rectangular sheet-like seal member is wrapped around the yet-to-be-sealed battery module whose first side cover is disposed in the other ends of the cell group and the gas duct member in the cell arrangement direction, thereby hermetically sealing the entire battery module.

In the present invention, for such battery module, the sealing process for sealing the sheet-like seal member to the yet-to-be-sealed battery module is performed as follows. Specifically, the sheet-like seal member is disposed so that its first edge and second edge extend in the cell arrangement direction. This sheet-like seal member is wrapped around the yet-to-be-sealed battery module so that the second end portion overlaps the first end portion from outside, the third end portion surrounds the first side cover, and the fourth end portion surrounds the second side cover. After that, the second end portion is hermetically fixed to the first end portion to form the sheet-like seal member into a sleeve shape, the third end portion is hermetically fixed to the first side cover, and the fourth end portion is hermetically fixed to the second side cover. Since the sealing is performed using the rectangular sheet-like seal member as above, the entire battery module can easily be sealed hermetically.

Furthermore, in the aforementioned battery module producing method, preferably, the sheet-like seal member is a full adhesive sheet-like seal member whose entire surface is applied with adhesive, and the sealing step includes: hermetically fixing by adhesion the second end portion to the first end portion; hermetically fixing by adhesion the third end portion to the first side cover; and hermetically fixing by adhesion the fourth end portion to the second side cover.

According to the present invention, a full adhesive sheet-like seal member whose whole area is applied with adhesive is used as the sheet-like seal member. In the sealing process, the second end portion is hermetically fixed by adhesion to the first end portion, the third end portion is hermetically fixed by adhesion to the first side cover, and the fourth end portion is hermetically fixed by adhesion to the second side cover. Utilizing such full adhesive sheet-like seal member, a desired portion can easily be sealed hermetically when the seal member is simply attached thereto. This can readily manufacture the battery module entirely hermetically sealed.

Furthermore, in the aforementioned battery module producing method, preferably, the sheet-like seal member is made of resin and the second end portion includes a second nonadhesive area which extends between the third edge and the fourth edge and is applied with no adhesive, and the sealing step includes hermetically fixing by welding the second nonadhesive area of the second end portion to the first end portion.

Considering the sealing characteristics of the finished battery module with respect to the electrolyte, as mentioned above, it is more preferable to fix the first end portion of the sheet-like seal member to the second end portion by welding than by adhesive. However, the way of additionally welding the adhered portion may lead to an insufficient welding result because of influence of the adhesive existing in the adhered portion.

On the other hand, the sheet-like seal member used in the present invention has, in the second end portion, the second nonadhesive area applied with no adhesive and extending from the third edge to the fourth edge. In the sealing process, this second nonadhesive area is hermetically fixed by welding to the first end portion. In this way, the second nonadhesive area of the second end portion and the first end portion can be fixed by only welding without interposing adhesive. Accordingly, the second nonadhesive area of the second end portion and the first end portion can reliably be fixed to each other.

Furthermore, in the aforementioned battery module producing method, preferably, the sheet-like seal member includes a second adhesive area applied with adhesive in the second end portion closer to the second edge than the second nonadhesive area, and the sealing step includes temporarily fixing by adhesion the second adhesive area of the second end portion to the first end portion, and then welding the second nonadhesive area of the second end portion to the first end portion.

The sheet-like seal member used in the present invention has the second adhesive area applied with adhesive in the second end portion, closer to the second edge than the second nonadhesive area. In the sealing process, the second adhesive area of the second end portion is attached to the first end portion for temporarily fixing the second adhesive area of the second end portion to the first end portion, and then the second nonadhesive area of the second end portion is welded to the first end portion. In the present invention, since the second adhesive area of the second end portion is attached to and temporarily fixed to the first end portion as above. This facilitates positioning or the like in welding the second nonadhesive area of the second end portion to the first end portion and readily at appropriate position.

Furthermore, in any one of the aforementioned battery module producing methods, preferably, the sheet-like seal member is made of resin, the third end portion includes a third nonadhesive area applied with no adhesive, extending between the first edge and the second edge, the fourth end portion includes a fourth nonadhesive area applied with no adhesive, extending between the first edge and the second edge, and the sealing step further includes hermetically fixing by welding the third nonadhesive area of the third end portion to the first side cover, and hermetically fixing by welding the fourth nonadhesive area of the fourth end portion to the second side cover.

Considering the sealing characteristics of the completed battery module with respect to the electrolyte, as described above, it is more preferable to fix the sheet-like seal member to the first and second side covers by welding than by adhesive. However, the way of additionally welding the adhered portion may lead to an insufficient welding result because of influence of the adhesive existing in the adhered portion.

On the other hand, the sheet-like seal member used in the present invention has, in the third end portion, the third nonadhesive area applied with no adhesive and extending from the first edge to the second edge, and also has, in the fourth end portion, the fourth nonadhesive area applied with no adhesive and extending from the first edge to the second edge. In the sealing process, the third nonadhesive area is hermetically fixed by welding to the first side cover and the fourth nonadhesive area is hermetically fixed by welding to the second side cover. In this way, the third nonadhesive area of the third end portion and the first side cover, and, the fourth nonadhesive area of the fourth end portion and the second side cover, can be fixed to each other by only welding without interposing adhesive. Consequently, the third nonadhesive area of the third end portion and the first side cover can be reliably fixed and the fourth nonadhesive area of the fourth end portion and the second side cover can be reliably fixed, respectively.

EXPLANATION OF REFERENCE CODES

Figure 1:
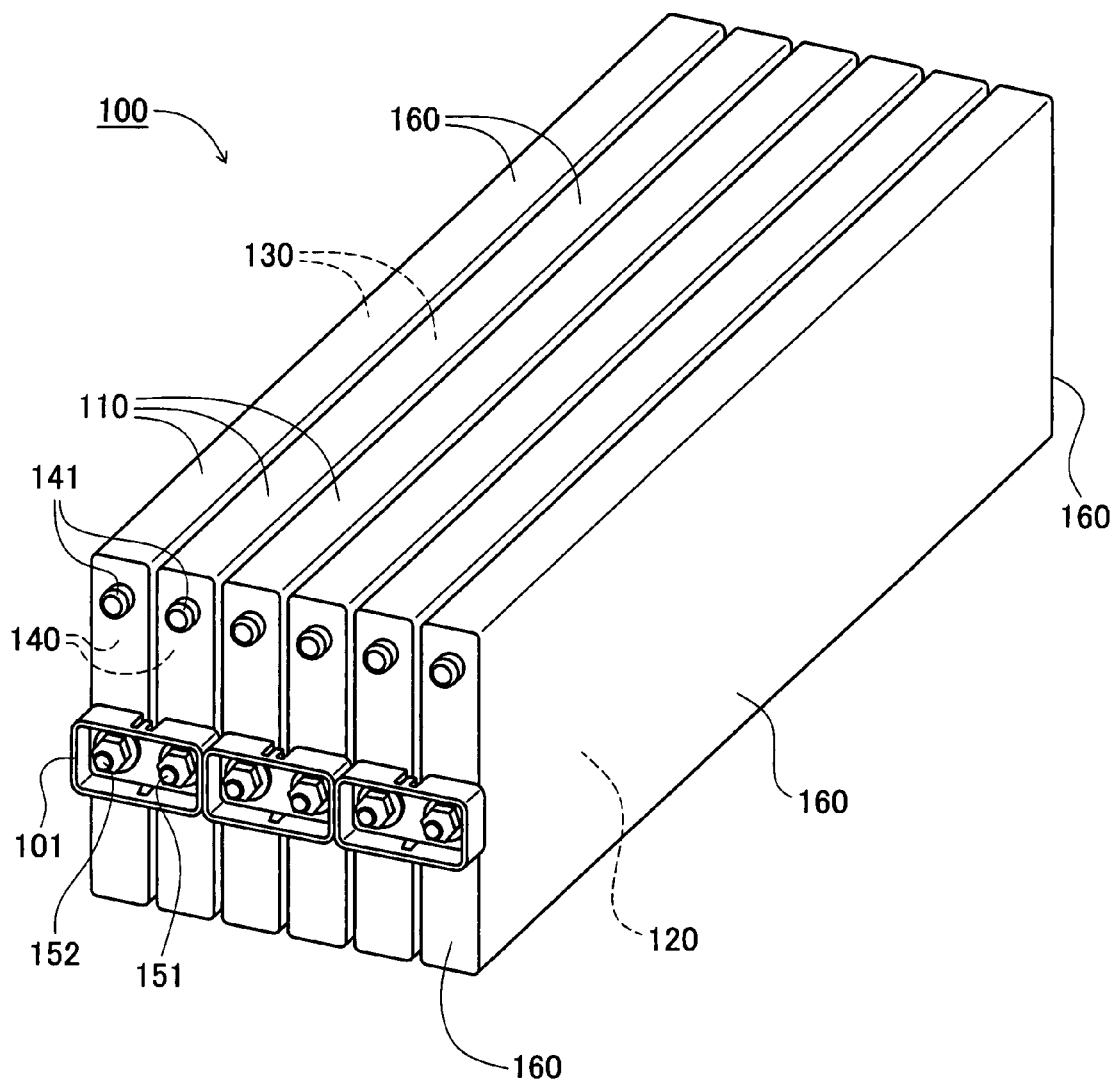
FIG. 1 is a perspective view of a battery pack in a first embodiment.

100 Battery pack
110 Battery module
120 Cell
121 Cell case
121a Top wall (Safety-valve mounting wall) (of Cell case)
121b Bottom wall (of Cell case)
121c, 121d First side wall (of Cell case)
121e, 121f Second side wall (of Cell case)
130 Gas duct member
131 Gas discharge path
160, 260 Seal member
300 Battery module
310 Cell group
311 Cell
313 Cell case
313c Third wall (Safety-valve mounting wall)
315 Safety valve
330, 630 Gas duct member
331 Gas discharge path
333 Positive-electrode side-cover-side end portion
335 Negative-electrode side-cover-side end portion
340 Positive-electrode side cover (First side cover)
350 Negative-electrode side cover (Second side cover)
353 Gas discharge port
360, 460, 560 Seal member
360p, 460p, 560p First open end portion
360q, 460q, 560q Second open end portion
361, 461, 561 Sheet-like seal member
361a, 461a, 561a First edge
361b, 461b, 561b Second edge
361c, 461c, 561c Third edge
361d, 461d, 561d Fourth edge
363, 463, 563 First end portion
365, 465, 565 Second end portion
367, 467, 567 Third end portion
369, 469, 569 Fourth end portion
365h, 465h Second nonadhesive area
366, 466 Second adhesive area
367h, 467h Third nonadhesive area
369h, 469h Fourth nonadhesive area
563h First nonadhesive area
564 First adhesive area
630p Sub gas-duct member
700 Battery pack
g1 First predetermined range
g2 Second predetermined range

BEST MODE FOR CARRYING OUT THE INVENTION

Preferred embodiments of the present invention will be explained below.

First Embodiment

Figure 2:
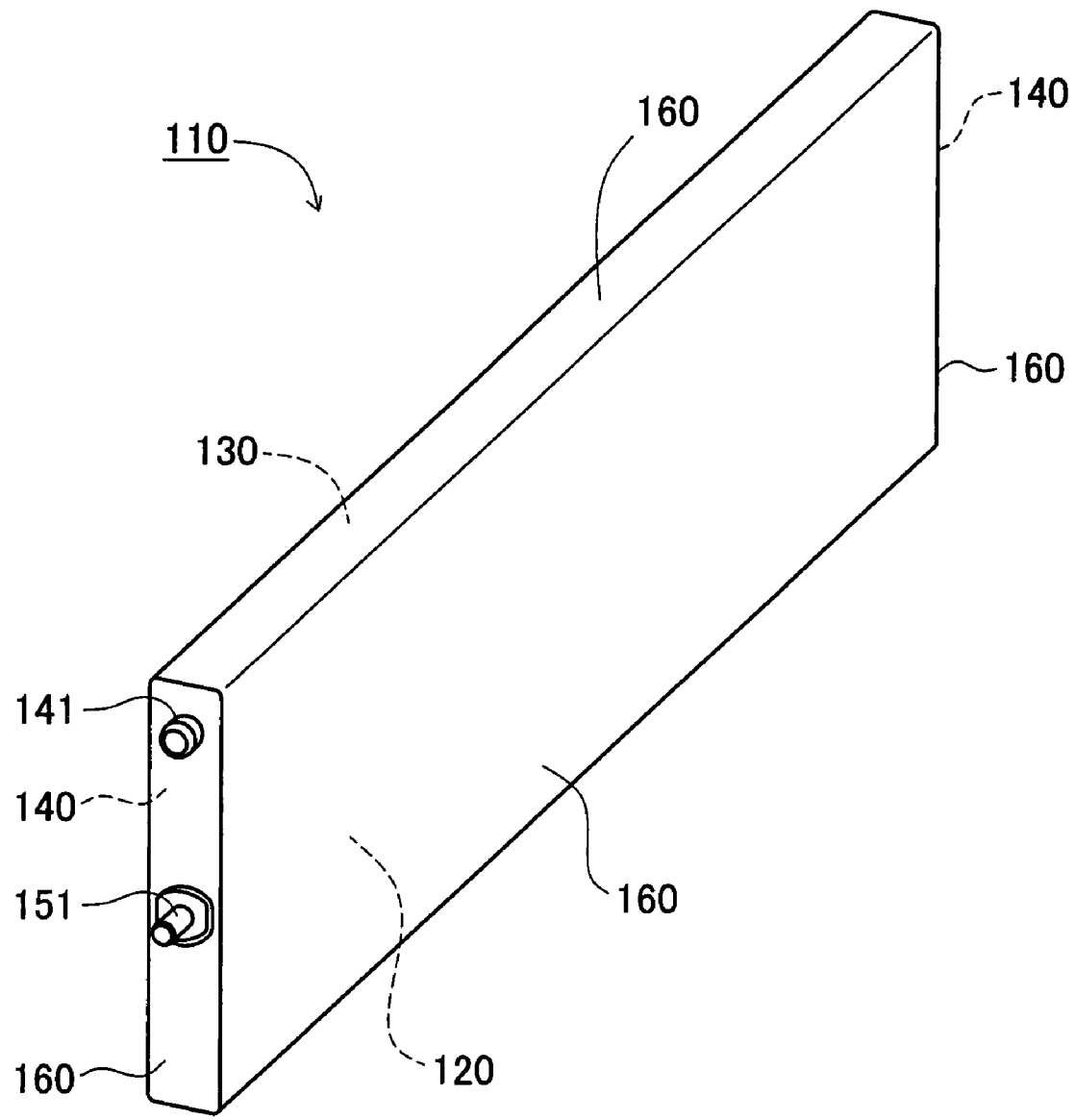
FIG. 2 is a perspective view showing a battery module in the battery pack in the first embodiment.
Figure 3:
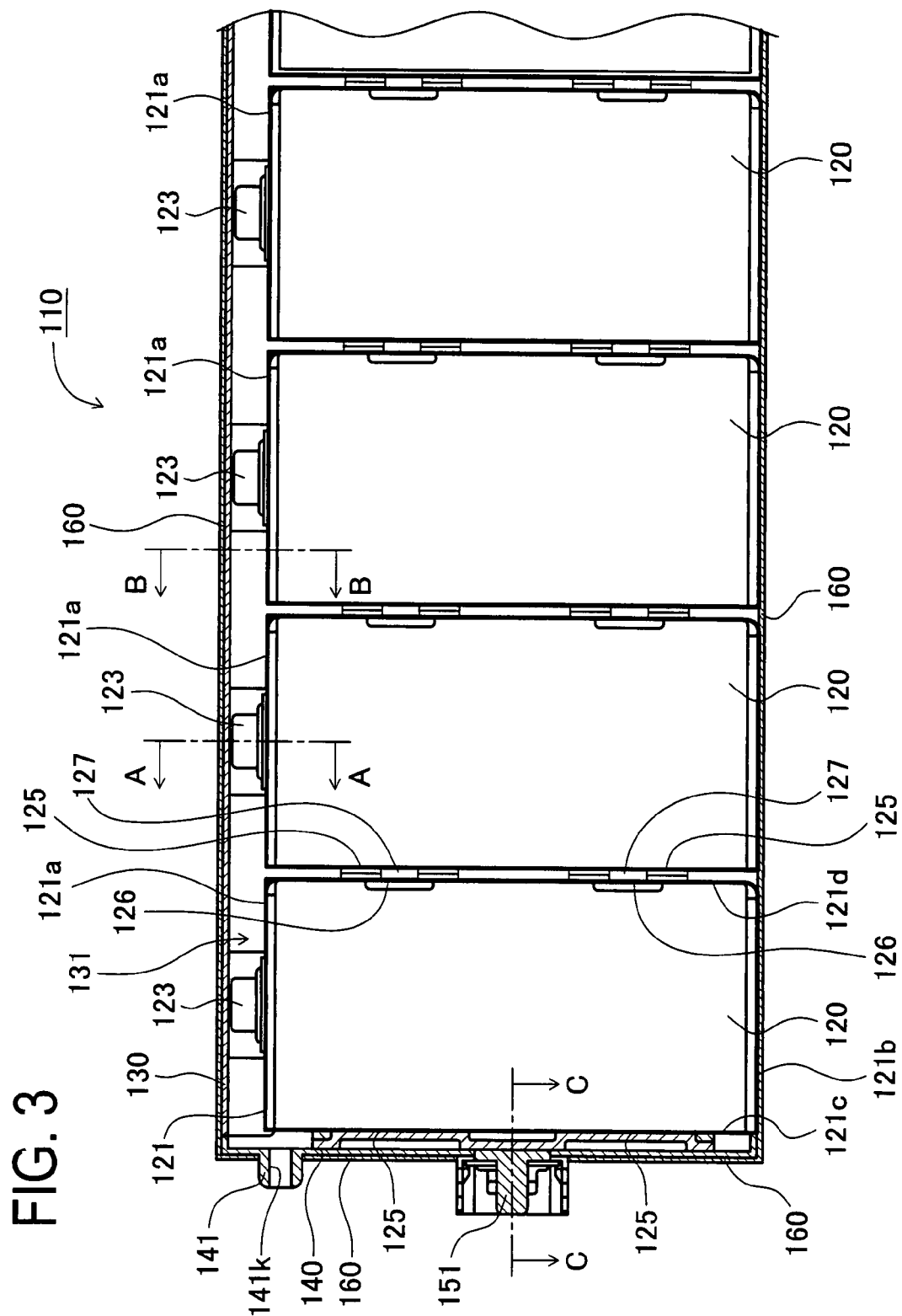
FIG. 3 is a partially sectional view of the battery module in a longitudinal direction, constituting the battery pack in the first embodiment.
Figure 4:
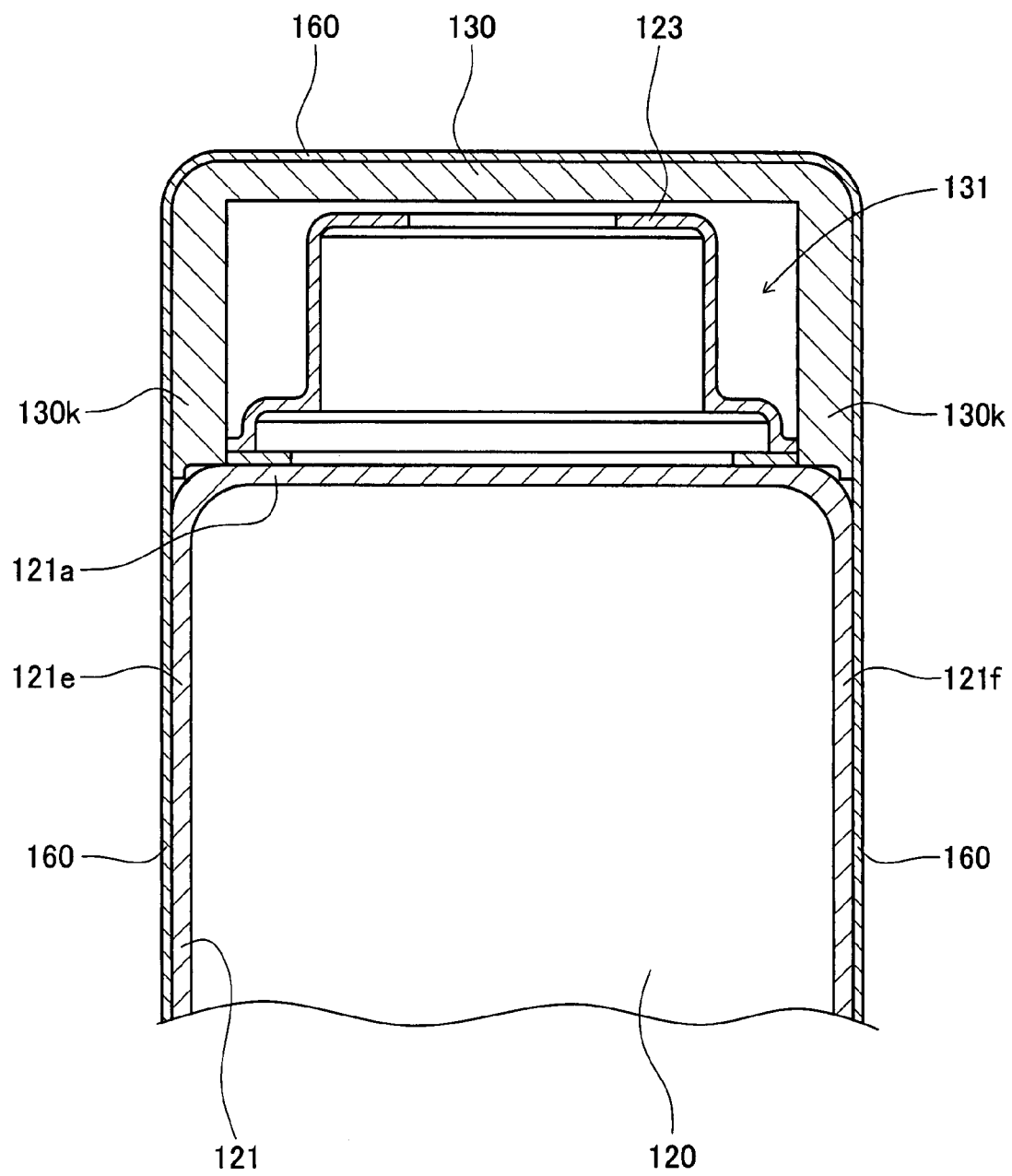
FIG. 4 is a sectional view of the battery pack in the first embodiment, taken along a line A-A of FIG. 3.
Figure 5:
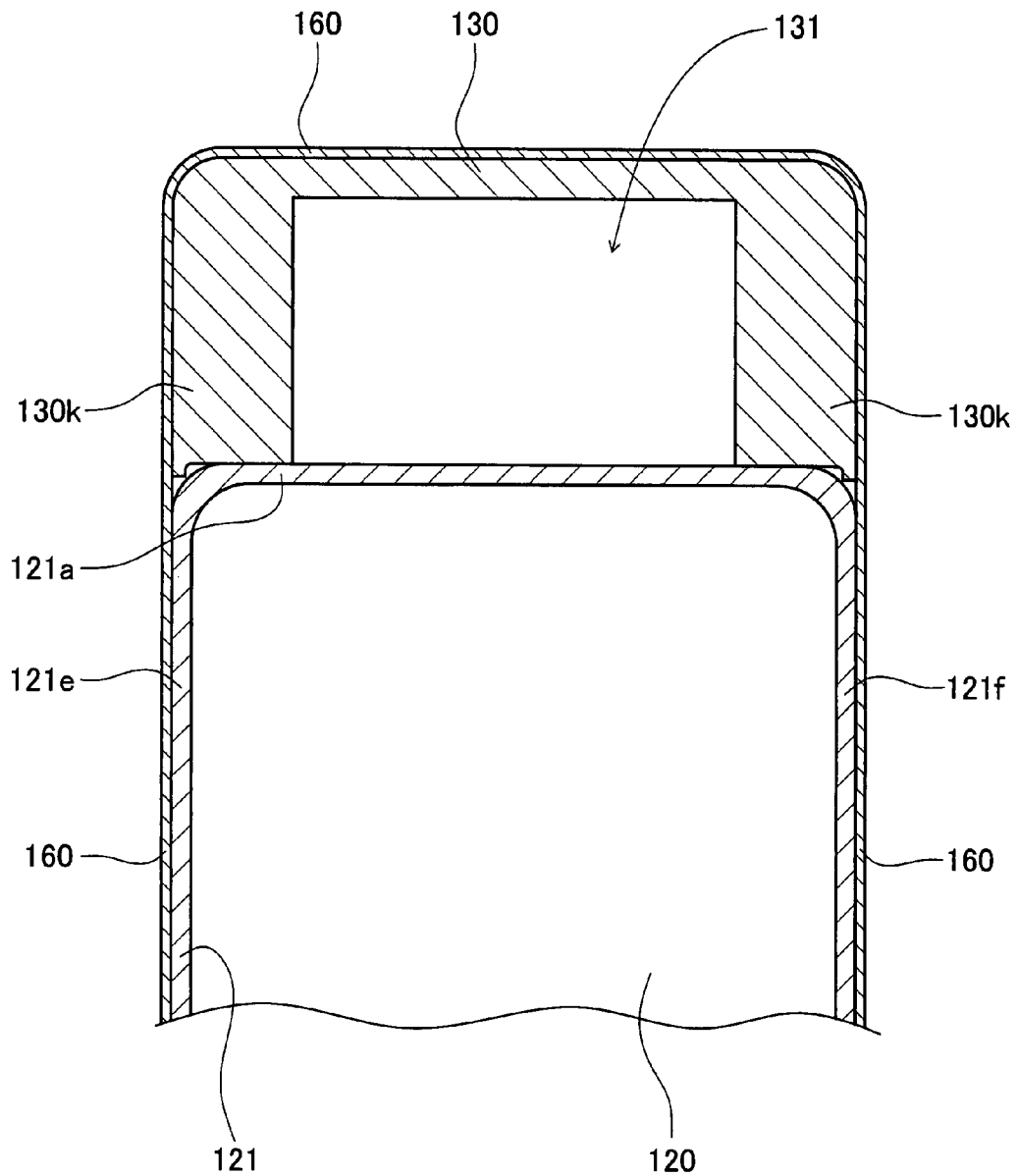
FIG. 5 is a sectional view of the battery pack in the first embodiment, taken along a line B-B of FIG. 3.
Figure 6:
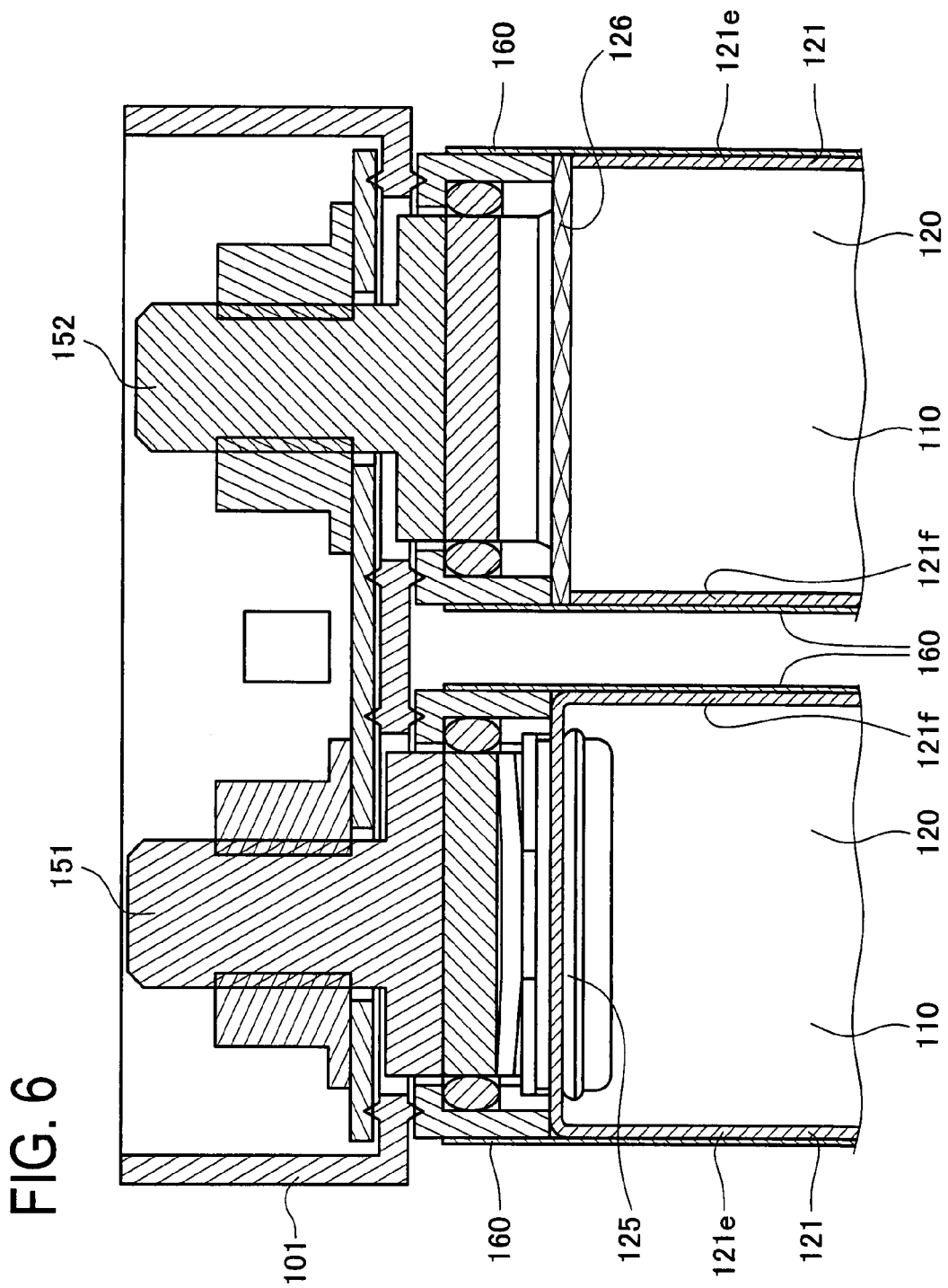
FIG. 6 is a sectional view of the battery pack in the first embodiment, taken along a line C-C of FIG. 3.

FIG. 1 is a perspective view of a battery pack 100 in a first embodiment; FIG. 2 is a perspective view showing a battery module 110 constituting the battery pack 100; FIG. 3 is a partially sectional view of the battery module 110 in a longitudinal direction; FIG. 4 is a sectional view taken along a line A-A of FIG. 3; FIG. 5 is a sectional view taken along a line B-B; and FIG. 6 is a sectional view taken along a line C-C.

This battery pack 100 is a secondary battery to be used as a power source for electric vehicles and hybrid electric vehicles. The battery pack 100 is comprised of a plurality of (six in FIG. 1) battery modules 110. A module positive terminal 151 of one battery module 110 and a module negative terminal 152 of the adjacent battery module 110 are connected, leaving slight space therebetween for cooling the battery, by a bus bar 101, so that the adjacent battery modules 110 are fixed to each other (see FIGS. 1 and 6).

Each battery module 110 constituting the battery pack 100 is of a rectangular parallelepiped shape (see FIGS. 1 and 2). The battery module 110 includes a plurality of cells 120 connected in series, a gas duct member 130 covering a top wall (a safety-valve mounting wall) 121a of each cell 120, side covers 140 covering side walls (first side walls 121c and 121d) positioned at both ends, the module positive terminal 151 and the module negative terminal 152, and a seal member 160 almost entirely covering the battery module 110 (see FIGS. 1 to 6).

Each cell 120 is a sealed secondary battery. This cell 120 includes a cell case 121, a safety valve 123 (whose internal structure is not shown), a cell positive terminal 125, a cell negative terminal 126, and a power generating element (not shown) accommodated in the cell case 121 (see FIGS. 3 to 6). Each cell 120 is further poured with an electrolyte.

Each cell case 121 is of a rectangular parallelepiped shape and made entirely of metal. This cell case 121 includes the rectangular top wall (a safety-valve mounting wall) 121a, a bottom wall 121b opposite the top wall 121a, two first side walls 121c and 121d each having a narrow area joining the short side of the top wall 121a and the short side of the bottom wall 121b, and two second side walls 121e and 121f each having a wide area joining the long side of the top wall 121a and the long side of the bottom wall 121b.

A safety valve 123 is centrally provided in the top wall 121a. This safety valve 123 is structured to operate when the internal pressure of the cell 120 exceeds a predetermined level due to the hydrogen gas generated during charge/discharge, thereby releasing the hydrogen gas to the outside of the cell.

Of the two first side walls 121c and 121d, one first side wall 121c (a left wall in FIG. 3) is provided with the cell positive terminal 125 and the other first side wall 121d (a right wall in FIG. 3) is provided with the cell negative terminal 126. The cell positive terminal 125 and the negative electrode terminal 126 of the adjacent cells 120 are electrically connected by terminal joints 127. The cell positive terminal 125 of the cell 120 positioned at one end (a front end in FIG. 2, a left end in FIG. 3) of the cell module 110 is electrically connected to the module positive terminal 151, while the cell negative terminal 126 of the cell 120 positioned at the other end (a rear end in FIG. 2) is electrically connected to the module negative terminal 152.

The power generating element includes a plurality of positive plates and a plurality of negative plates which are alternately laminated with separators interposed therebetween. The positive electrode constituted of the plurality of positive plates is electrically connected to the cell positive terminal 125, while the negative electrode constituted of the plurality of negative plates is electrically connected to the cell negative terminal 126.

The plurality of cells 120 constituting the battery module 110 is disposed so that respective top walls 121a are oriented in the same direction. The cells 120 are also arranged in a row so that the first side walls 121c and 121d of the adjacent cells 120 face each other and the second side walls 121e and 121f of each cell 120 face outwardly (see FIG. 3).

The gas duct member 130 are placed in contact with the top walls 121a of the cells 120 arranged in a row to cover all the safety valves 123 and cover almost entirely the top walls 121a of the cells 120 (see FIGS. 3 to 5). To be concrete, the gas duct member 130 is made of resin such as polypropylene (PP), which extends in a longitudinal direction of the battery module 110 and is of an angular U-shaped section in a direction perpendicular to the longitudinal direction. Leg parts 130k of the gas duct member 130 are in contact with the top wall 121a of each cell 120. This leg part 130k is formed to be thin in a portion covering the safety valve 123 and thick in another portion not covering the safety valve 123 (see FIGS. 4 and 5). A gas discharge path 131 communicated with a gas discharge port 141k mentioned later is formed between the gas duct member 130 and the top wall of each cell 120.

Of the side covers 140 covering the first side walls 121c and 121d of the cells 120 at both ends, one side cover 140 (a front one in FIG. 2, a left one in FIG. 3) is in contact with the first side wall 121c of the cell 120 positioned at one end to almost entirely cover the first side wall 121c and in butted relation with one end of the gas duct member 130. Further, the other side cover 140 (a rear one in FIG. 2) is in contact with the first side wall 121d of the cell 120 positioned in the other end to almost entirely cover the first side wall 121d and in butted relation with the other end of the gas duct member 130. The side covers 140 are made of resin such as polypropylene (PP) as with the gas duct member 130. In an upper center, each side cover 140 is integrally provided with a cylindrical gas discharge portion 141 formed with a gas discharge port 141k. The gas discharge port 141k is communicated with the gas discharge path 131 formed between the top wall 121a of each cell 120 and the gas duct member 130, allowing hydrogen gas if released from each cell 120 to be discharged to the outside of the cell module (outside of the battery pack) through this gas discharge port 141k.

The seal member 160 is made from a sheet-like adhesive tape having a thickness of about 0.1 mm. The seal member 160 is attached to cover all parts excepting the gas discharge portion 141, the module positive terminal 151, and the module negative terminal 152, while the gas duct member 130 and the side covers 140 are placed in contact with the cells 120 arranged in a row. Thus, the gas duct member 130 and the side covers 140 are fixed to the cells 120. A gap between the gas duct member 130 and each cell 120 is hermetically sealed and also a gap between the adjacent cells 120 is hermetically sealed. When the gas duct member 130 and the side covers 140 are in contact with the cells 120, the battery module 110 is of a rectangular parallelepiped shape, which facilitates adhesion of the seal member 160.

This battery pack 100 is produced in such a manner that the cells 120, each having been produced by a well known technique, are arranged in a row, the gas duct member 130 and the side covers 140 are disposed in place with respect to the cells 120, the seal member 160 is attached thereto, making up the battery module 110. Then, the battery modules 110 are fixedly connected by the bus bars 101, completing the battery pack 100.

In such battery pack 100, the gas discharge path 131 is formed between the top wall (the safety-valve mounting wall) 121a of each cell 120 and the gas duct member 130 covering all the safety valves 123 of the cells 120 included in the battery module 110. The gap between each cell case 121 and the gas duct member 130 is hermetically sealed by the seal member 160. Accordingly, the need for the connection nozzle conventionally attached to each cell can be eliminated, thereby making it possible to achieve the inexpensive battery module 110 and the battery pack 100 at low cost.

In the first embodiment, furthermore, the seal member 160 seals the gap between the gas duct member 130 and each cell case 120 (121 の間違い) and simultaneously fixes the gas duct member 130 to the cell cases 121. Thus, there is no need for an additional operation to join or bond the gas duct member 130 to the cell cases 121.

Further, the seal member 160 hermetically seals the gap between the adjacent cell cases 121. There is no need to fill by joining or bonding the gap between the cell cases 121.

The seal member 160 is an adhesive tape, which is attached to bridge across each cell case 121 and the gas duct member 130 so as to close the gaps therebetween. This makes it possible to readily and inexpensively seal between each cell case 121 and the gas duct member 130 and between the cell cases 121. Further, the gas duct member 130 can easily be fixed to each cell case 121.

In the first embodiment, the cell case 121 is made of metal, while the seal member 160 is an electrical insulating adhesive tape which covers the metallic surface (the case surface) of each cell case 121. Accordingly, the metallic surface of each cell case 121 is unexposed to the outside of the battery pack, which makes it possible to reliably prevent current leakage which would be caused by surface condensation.

In the first embodiment, the seal member 160 is in a sheet form having a thickness of 0.5 mm or less, which can sufficiently ensure the cooling characteristics of the cells 120.

In the first embodiment, each cell case 121 has the top wall (the safety-valve mounting wall) 121a of a rectangular parallelepiped shape and the cells 120 are arranged in a row so that the first side walls 121c and 121d face each other. Accordingly, any cell 120 belonging to the same battery module 110 does not exist along the second side walls 121e and 121f. Thus, each cell 120 can efficiently be cooled through the second side walls 121e and 121f having a wider area, and hence the cooling characteristics of the cells 120, or the battery pack 100, can be enhanced.

Second Embodiment

A second embodiment will be explained below. The explanation of identical parts to those in the first embodiment is omitted or simplified.

Figure 7:
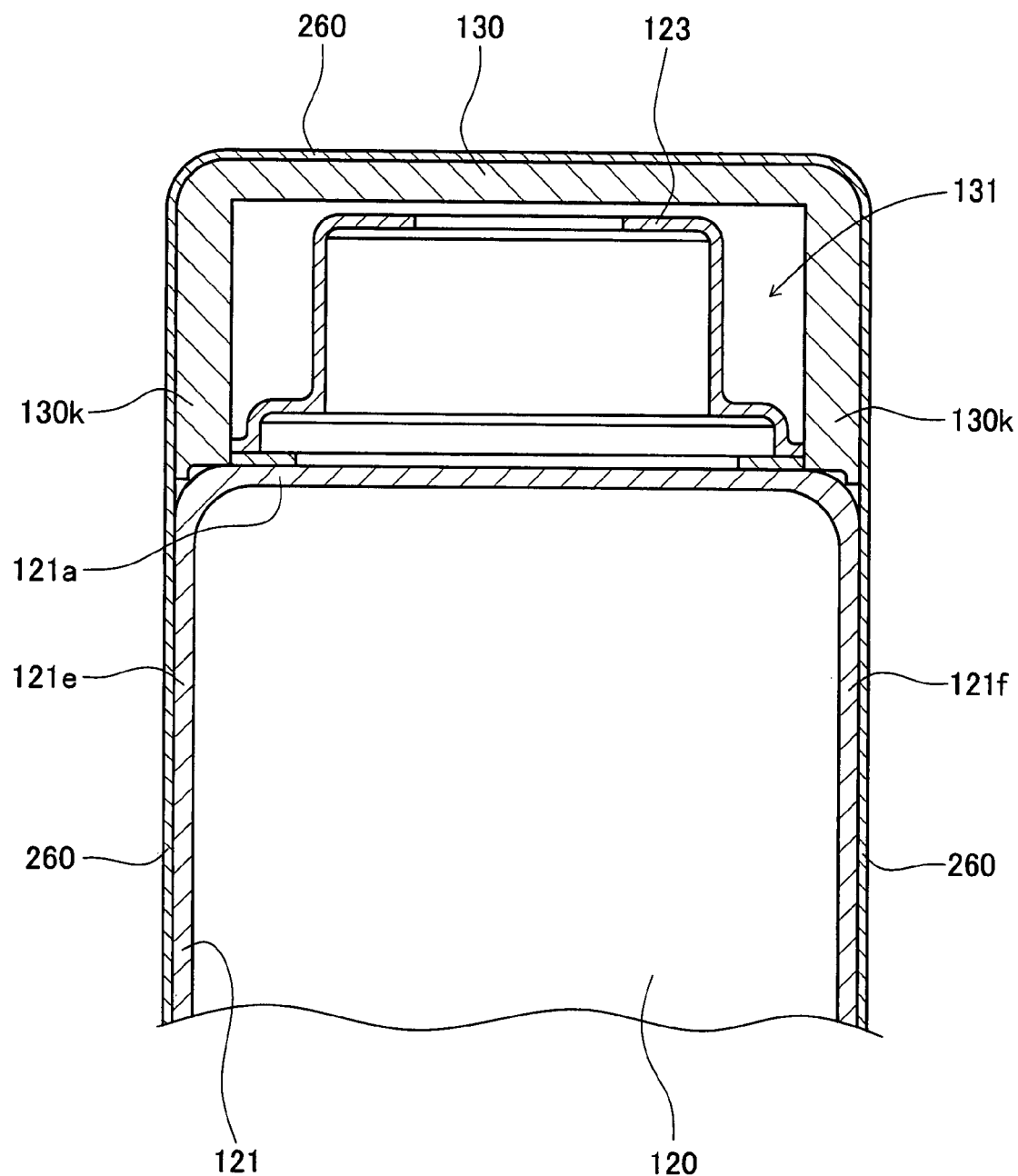
FIG. 7 is a sectional view of a part of a battery pack in a second embodiment, corresponding to FIG. 4 in the first embodiment.
Figure 8:
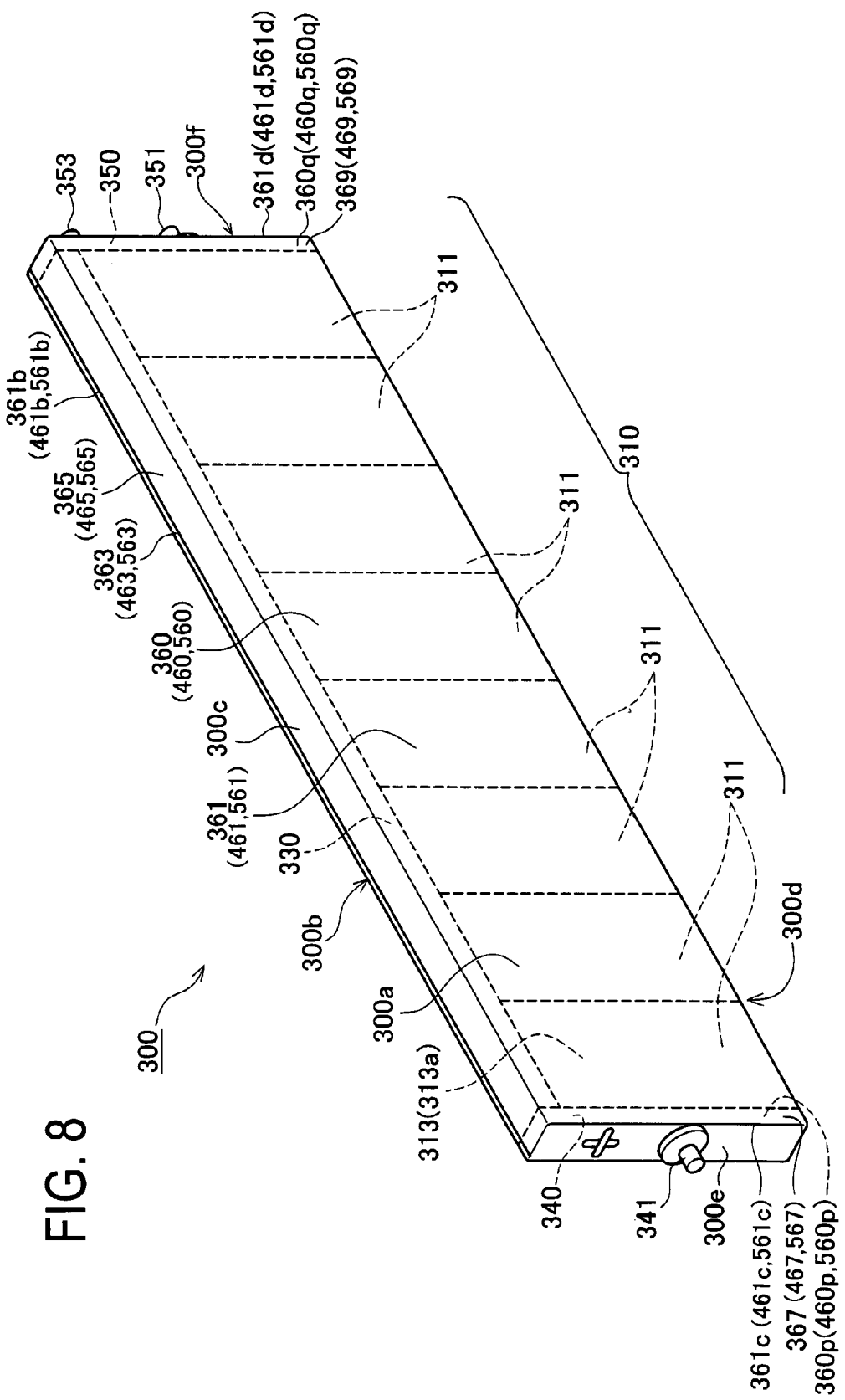
FIG. 8 is a perspective view of a battery module in a third embodiment.

FIG. 7 is a sectional view similar to FIG. 4 of the first embodiment. This battery pack in the second embodiment is different in a seal member 260 formed of a heat-shrinkable tube from the battery pack 100 in the first embodiment in which the seal member 160 is formed of an adhesive tape, and otherwise identical to in the first embodiment. This seal member 260 in a shrunken state surrounds, in sleeve shape, entirely the cell cases 121 and the gas duct member 130 and holds each cell case 121 and the gas duct member 130 in mutually pressure contact relation. With this configuration, it is also possible to readily and inexpensively seal between each cell case 121 and the gas duct member 130. The gas duct member 130 can also easily be fixed to the cell cases 121.

As for the rest, similar parts to those in the first embodiment provide similar operations and effects to those in the first embodiment.

Third Embodiment

A third embodiment will be explained below. FIGS. 8 to 13 show a battery module 300 in the third embodiment. FIG. 14 shows a sheet-like seal member 361 to be utilized in production of the battery module 300. The battery module 300 is a secondary battery (e.g. a nickel-metal hydride storage battery) to be used as a power source for electric vehicles and hybrid electric vehicles. The battery module 300 is of a nearly rectangular parallelepiped shape having opposite first long side wall 300*a* and second long side wall 300*b*, opposite first short side wall 300*c* and second short side wall 300*d*, and opposite first end wall 300*e* and second end wall 300*f*.

The battery module 300 comprises a cell group 310 including a plurality of cells 311, a gas duct member 330 covering each safety valve 315 of the cell group 310, a positive-electrode side cover (a first side cover) 340 and a negative-electrode side cover (a second side cover) 350 which respectively cover the cell group 310 and the gas duct member 330 from both ends in a cell arrangement direction, and a seal member 360 which surrounds the cell group 310 and the gas duct member 330 to hermetically entirely seal the module.

The cell group 310 is configured so that a plurality of (eight in the present embodiment) cells 311 is connected in series and in a row. Each cell 311 is a sealed secondary battery. This cell 311 includes a cell case 313, a safety valve 315 provided in each cell case 313, a cell positive terminal 317 and a cell negative terminal 319 which are provided in the cell case 313, and a power generating element (not shown) accommodated in the cell case 311 (see FIG. 13). Each cell case 313 is further poured with an electrolyte.

Each cell case 313 is of a rectangular parallelepiped shape and made entirely of metal. This cell case 313 includes opposite first wall 313*a* and second wall 313*b* having a largest area (see FIGS. 8 and 9), opposite third wall (a safety-valve mounting wall) 313*c* and fourth wall 313*d* each joining the short side of the first wall 313*a* and the short side of the second wall 313*b* (see FIG. 13), and opposite fifth wall 313*e* and sixth wall 313*f* each joining the long side of the first wall 313*a* and the long side of the second wall 313*b* (see FIG. 13).

Figure 13:
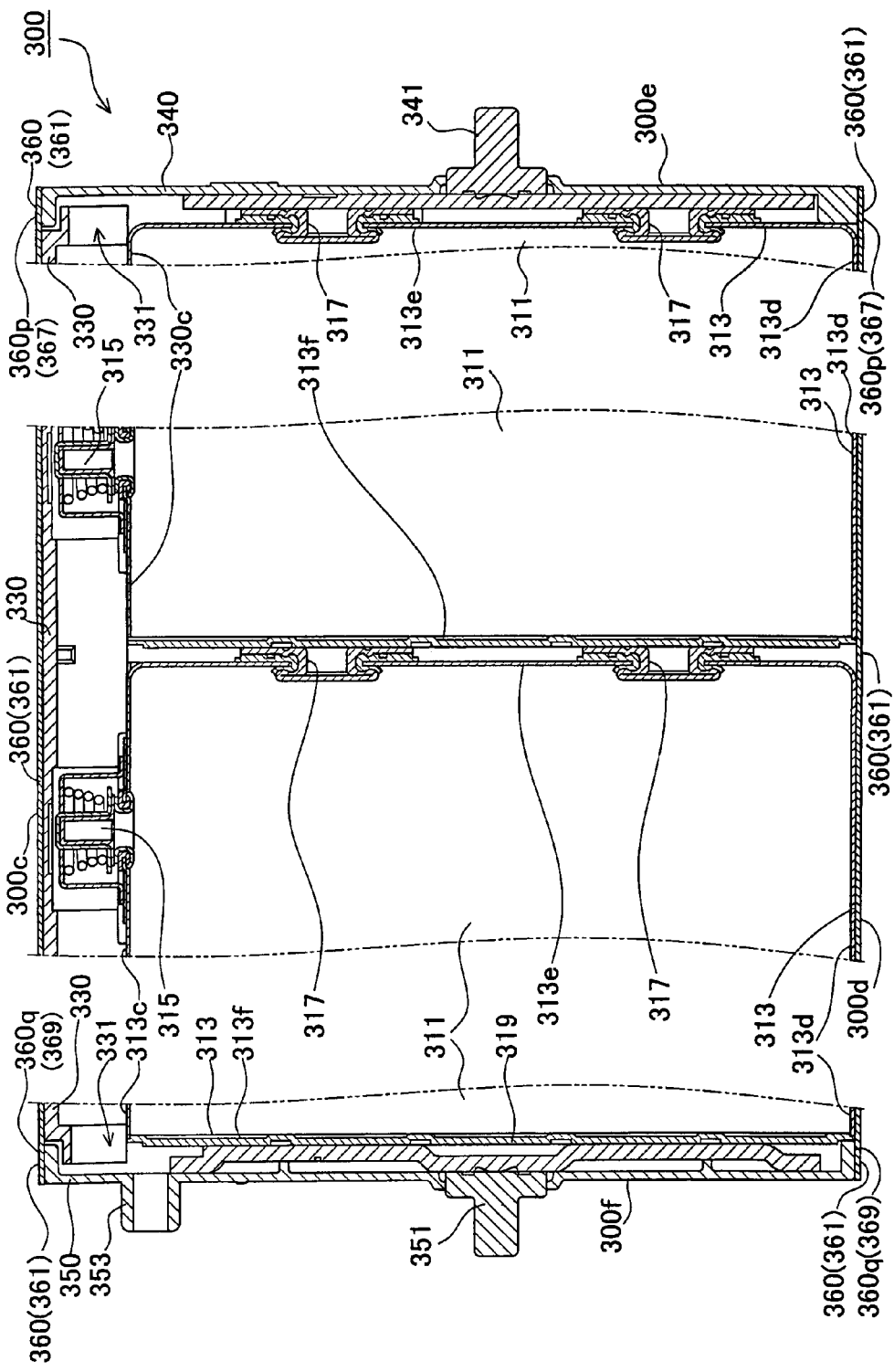
FIG. 13 is a partially sectional view of the battery module in the third embodiment.
Figure 14:
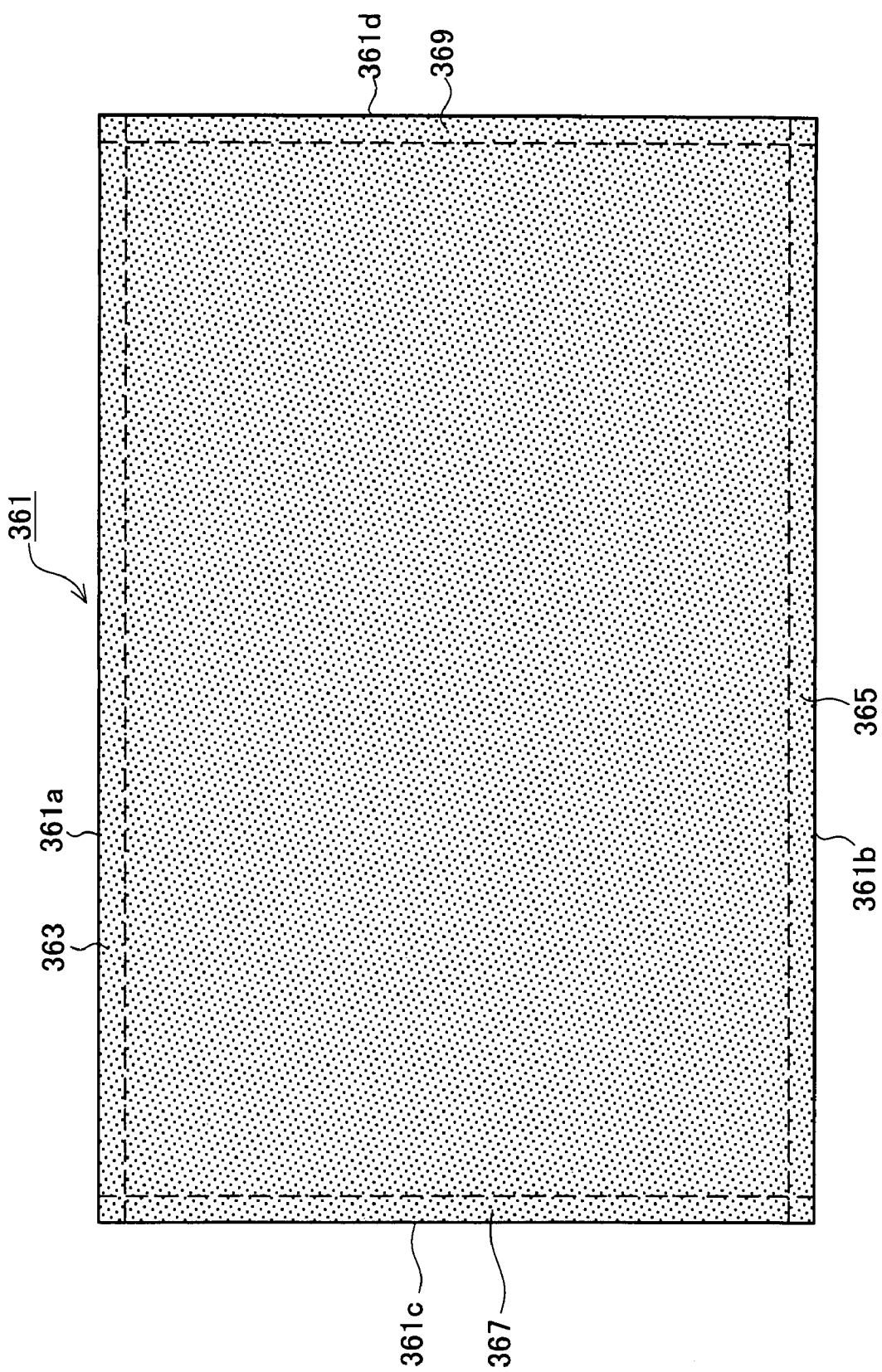
FIG. 14 is an explanatory view showing a sheet-like seal member to be used in production of the battery module in the third embodiment.

Of them, the third wall (the safety-valve mounting wall) 313*c* is provided with the safety valve 315 at nearly the center thereof (see FIG. 13). This safety valve 315 is structured to operate when the internal pressure of the cell 311 exceeds a fixed level due to the hydrogen gas generated during charge/discharge, thereby releasing the hydrogen gas to the outside of the cell.

The fifth wall 313*e* is formed with two cell positive terminals 317 spaced apart from each other at a predetermined distance (see FIG. 13). The sixth wall 313*f* is almost entirely provided with the cell negative terminal 319. The cell positive terminal 317 of one cell 311 and the negative terminal 319 of the adjacent cell 311 are fixed by welding to each other to be electrically connected. The cell positive terminal 317 of the cell 311 (a right one in FIG. 13) positioned at one end of the cell group 310 in the cell arrangement direction is electrically connected, inside the module, to a module positive terminal 341 mentioned later. On the other hand, the cell negative terminal 319 of the cell (a left one in FIG. 13) 311 positioned at the other end is electrically connected, inside the module, to a module negative terminal 351 mentioned later.

The power generating element includes a plurality of positive plates and a plurality of negative plates which are alternately laminated with separators interposed therebetween. The positive electrode constituted of the plurality of positive plates is electrically connected to the cell positive terminal 317 inside the cell, while the negative electrode constituted of the plurality of negative plates is electrically connected to the cell negative terminal 319 inside the cell.

The cells 311 are arranged in a row so that respective third walls (safety-valve mounting walls) 313*c* are oriented in the same direction and the fifth wall 313*e* of one cell 311 and the sixth wall 313*f* of the adjacent cell 311 face each other. The cell group 310 is thus made up.

The cell group 310 is in contact with the gas duct member 330 which covers each safety valve 315 and almost entirely each third wall (each safety-valve mounting wall) 313*c*. This gas duct member 330 is made of resin such as polypropylene (PP), which extends in the cell arrangement direction and is of an angular U-shaped section in a direction perpendicular to the cell arrangement direction. Placing such gas duct member 330 forms a gas discharge path 331 connected to a gas discharge port 353 mentioned later between the gas duct member 330 and each third wall (each safety-valve mounting wall) 313*c* of the cell group 310 (see FIG. 13).

A positive-electrode side cover 340 is placed at one ends (right in FIG. 13) of the cell group 310 and the gas duct member 330 in the cell arrangement direction to cover them from the one ends in the cell arrangement direction. The positive-electrode side cover 340 is in contact with this fifth wall 313*e* of the cell 311 positioned at one end of the cell group 310 and the gas duct member 330 while covering the almost entire surface of the fifth wall 313*e* and the one end of the gas duct member 330.

The positive-electrode side cover 340 is made of resin such as polypropylene (PP) as with the gas duct member 330. At substantially the center of the positive-electrode side cover 340, a column-shaped, module positive terminal 341 is fixedly provided protruding to the outside of the module. This module positive terminal 341 is electrically connected, inside the module, to the cell positive terminal 317 of the cell 311 positioned at one end of the cell group 310, as mentioned above.

Further, at the other ends (left in FIG. 13) of the cell group 310 and the gas duct member 330 in the cell arrangement direction, a negative-electrode side cover 350 is placed covering them from the other ends in the cell arrangement direction. The negative-electrode side cover 350 is in contact with the sixth wall 313*f* of the cell 311 positioned at the other end of the cell group 310 and the gas duct member 330 while covering the almost entire surface of the sixth wall 313f and the other end of the gas duct member 330.

This negative-electrode side cover 350 is also made of resin such as polypropylene (PP) as with the gas duct member 330. At substantially the center of the negative-electrode side cover 350, a column-shaped, module negative terminal 351 is fixedly provided protruding to the outside of the module. This module negative terminal 351 is electrically connected, inside the module, to the cell negative terminal 319 of the cell 311 positioned at the other end of the cell group 310, as mentioned above. A cylindrical gas discharge port 353 is formed in the upper center of the negative-electrode side cover 350. This gas discharge port 353 is communicated with the gas discharge path 331 formed between the gas duct member 330 and the safety-valve mounting walls 313c of the cell group 310, allowing hydrogen gas if released from each cell 311 to be discharged to the outside of the module through the gas discharge port 353.

In the third embodiment, as above, the gas duct member 330 is placed to form the gas discharge path 331 between the gas duct member 330 and the safety-valve mounting walls 313c. Further, the negative-electrode side cover 350 having the gas discharge port 353 communicated with the gas discharge path 331 is placed to discharge hydrogen gas to the outside of the module through it. Accordingly, the discharge path for hydrogen gas can be formed more readily and inexpensively as compared with the conventional one.

The resin seal member 360 having the electrical insulation property is placed between the positive-electrode side cover 340 and the negative-electrode side cover 350 (see FIGS. 8 to 13). The seal member 360 is of a sleeve shape which is wrapped around the cell group 310 and the gas duct member 330 about the axis in the cell arrangement direction. A first open end portion 360p at one end is hermetically fixed by adhesion around the positive-electrode side cover 340. A second open end portion 360q at the other end surrounds the negative-electrode side cover 350 and is hermetically fixed by adhesion to the negative-electrode side cover 350. Applied with adhesive on the entire inner surface, the seal member 360 is also attached in close contact with each cell case 313 of the cell group 310 and the gas duct member 330.

With such seal member 360, the battery module 300 is entirely hermetically sealed. This makes it possible to prevent the hydrogen gas released through the safety valve 315 from leaking to the outside through any portion other than the gas discharge port 353. Even when the electrolyte leaks from each cell 311, it is also possible to prevent the electrolyte from leaking to the outside of the module. Since the seal member 360 is attached in close contact with each cell case 313 of the cell group 310, furthermore, breakage of the seal member 360 in handling of the battery module 300 or other defects can be prevented. The seal member 360 is firmly attached to each cell case 313, enhancing the heat release characteristics of each cell 311, thus efficiently cooling each cell 311.

The seal member 360 is formed from the rectangular sheet-like seal member 361 shown in FIG. 14, having opposite first edge 361a and second edge 361d, and opposite third edge 361c and fourth edge 361d. This sheet-like seal member 361 is a full adhesive sheet-like seal member having a thickness of about 100 μm and entirely applied with adhesive. Accordingly, the adhesive is applied to a stripe-shaped first end portion 363 provided along the first edge 361a and to be placed on the top wall (which faces the first short side wall 300c of the battery module 300) of the gas duct member 330 and also a stripe-shaped second end portion 365 provided along the second edge 361b and to be placed on the top wall (which faces the first short side wall 300c of the battery module 300) of the gas duct member 330 and overlapped on the first end portion 363 from outside.

Similarly, the adhesive is applied to a stripe-shaped third end portion 367 provided along the third edge 361c to be fixed to around the positive-electrode side cover 340 and a stripe-shaped fourth end portion 369 provided along the fourth edge 361d to be fixed to around the negative-electrode side cover 350. The third end portion 367 of the sheet-like seal member 361 corresponds to the first open end portion 360p of the seal member 360. The fourth end portion 369 of the sheet-like seal member 361 corresponds to the second open end portion 360q of the seal member 360.

The seal member 360 is formed in such a manner that this sheet-like seal member 361 is wrapped around a yet-to-be-sealed battery module, the second end portion 365 is overlapped on the first end portion 363 from outside, and then they are hermetically fixed by adhesion in a sleeve shape. The third end portion 367 of the sheet-like seal member 361 forms the first open end portion 330p, which surrounds the positive-electrode side cover 340 and is hermetically fixed by adhesion to the positive-electrode side cover 340. The fourth end portion 369 forms the second open end portion 330q, which surrounds the negative-electrode side cover 350 and is hermetically fixed by adhesion to the negative-electrode side cover 350. By use of such rectangular sheet-like seal member 361, it is possible to readily provide the seal member 360 capable of hermetically surrounding the cell group 310 and the gas duct member 330.

The following description will be made on a producing method of the above battery module 300 (see FIGS. 8 to 14).

Firstly, the cells 311 produced by a well known technique are connected in series and arranged in a row, constituting the cell group 310. The gas duct member 330, the positive-electrode side cover 340, and the negative-electrode side cover 350 are placed in respective appropriate positions of the cell group 310. The battery module in this state corresponds to the yet-to-be-sealed battery module of the present invention.

In the sealing process, secondly, the aforementioned rectangular sheet-like seal member 361 is wrapped around this yet-to-be-sealed battery module to hermetically seal the battery module 300. To be more specific, the sheet-like seal member 361 is arranged so that its first edge 361a and second edge 361b extend in the cell arrangement direction. Then, the first end portion 363 of the sheet-like seal member 361 is attached to the upper surface of the gas duct member 330 of the yet-to-be-sealed battery module (see the sheet-like seal member 361 and others schematically illustrated in FIG. 10).

After that, the sheet-like seal member 361 is attached to the yet-to-be-sealed battery module while it is wrapped around the module about the axis in the cell arrangement direction. Since the sheet-like seal member 361 in the third embodiment is a full adhesive sheet-like seal member, the third end portion 367 of the sheet-like seal member 361 is wrapped around the positive side cover 340 while adhering to the positive side cover 340. The fourth end portion 369 is wrapped around the negative-electrode side cover 350 while adhering to the negative-electrode side cover 350. Further, the sheet-like seal member 361 is also attached to each cell case 313 of the cell group 310 and the gas duct member 330. Finally, the second end portion 365 of the sheet-like seal member 361 is attached to the first end portion 363 from outside.

When the sheet-like seal member 361 is attached to the yet-to-be-sealed battery module as above, the first end portion 363 and the second end portion 365 of the sheet-like seal member 361 are hermetically fixed to each other by adhesion in a sleeve shape. The third end portion 367 of the sheet-like seal member 361 is hermetically fixed by adhesion to the positive-electrode side cover 340. The fourth end portion 369 of the sheet-like seal member 361 is hermetically fixed by adhesion to the negative-electrode side cover 350. Further, the sheet-like seal member 361 is attached by adhesion in close contact with each cell case 313 of the cell group 310 and the gas duct member 330. Thus, the battery module 300 is completed.

The above sealing using the rectangular sheet-like seal member 361 allows the entire battery module 300 to be hermetically sealed readily. In the third embodiment, furthermore, the full adhesive sheet-like seal member is used for the sheet-like seal member 361. This seal member has only to be attached to the module 300 to hermetically seal the predetermined portions.

Fourth Embodiment

A fourth embodiment will be explained below. The explanation of similar parts to those in the third embodiment is omitted or simplified.

Figure 15:
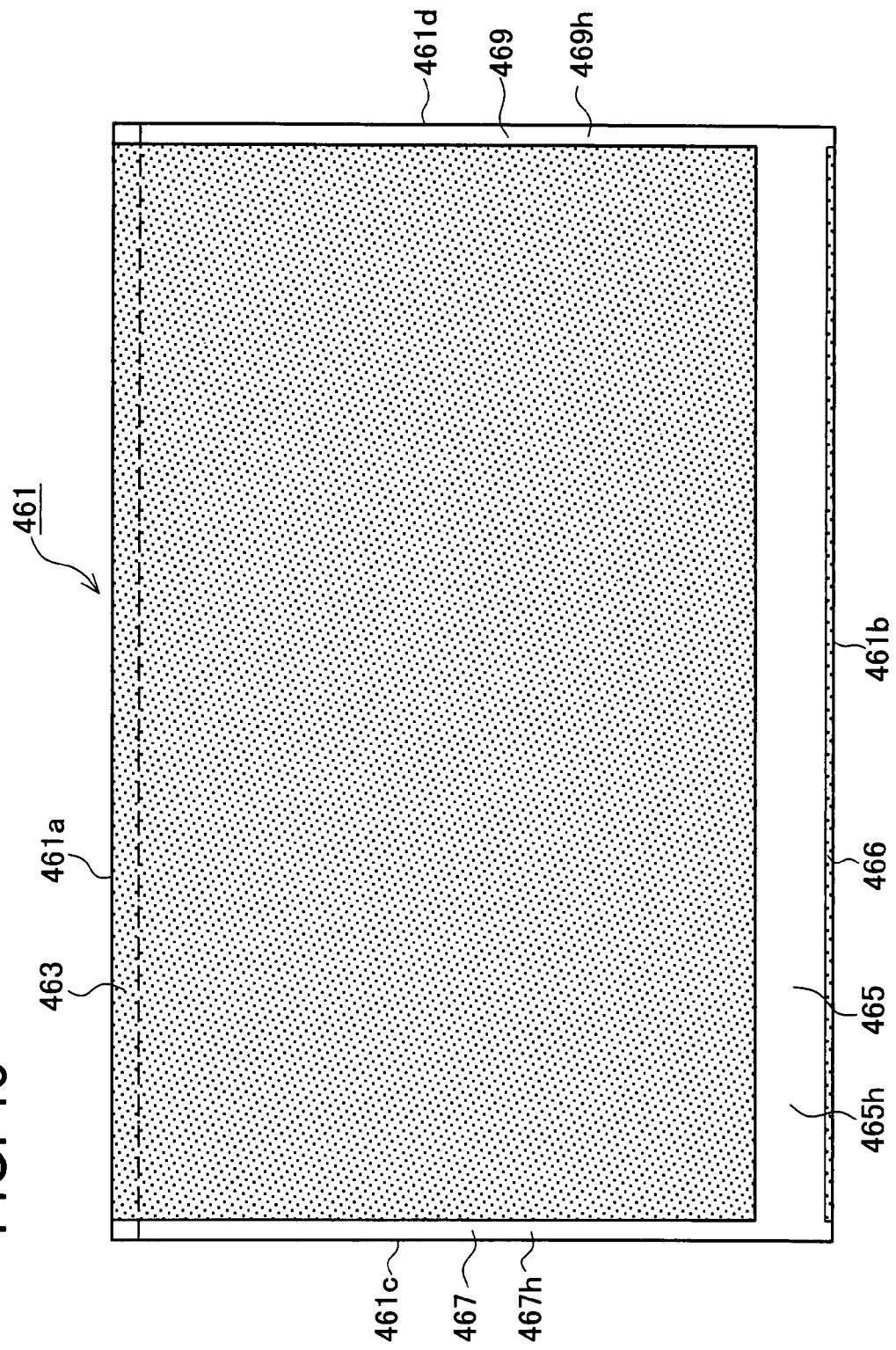
FIG. 15 is an explanatory view showing a sheet-like seal member to be used in production of the battery module in a fourth embodiment.

In the fourth embodiment, a sheet-like seal member 461 forming a seal member 460 is different from the sheet-like seal member 361 in the aforementioned third embodiment. The others are basically similar to those in the third embodiment. FIG. 15 shows the sheet-like seal member 461 used in a battery module in the fourth embodiment.

This sheet-like seal member 461 is of a rectangular shape having opposite first edge 461a and second edge 461b, and opposite third edge 461c and fourth edge 461d. This sheet-like seal member 461 is also a sheet having a thickness of about 100 μm and applied with adhesive, but it partly includes an area applied with no adhesive, which is different from the third embodiment.

To be concrete, a stripe-shaped first end portion 463 provided along the first edge 461a and to be placed on the upper surface of the gas duct member 330 is applied with adhesive as with the first end portion 363 of the sheet-like seal member 361 in the third embodiment.

On the other hand, a stripe-shaped second end portion 465 provided along the second edge 461b and to be placed on the upper surface of the gas duct member 330 and overlapped on the first end portion 463 from outside includes a second nonadhesive area 465h applied with no adhesive, which extends between the third edge 461c and the fourth edge 461d. In the second end portion 465, closer to the second edge 461b than the second nonadhesive area 465h, a stripe-shaped second adhesive area 466 applied with adhesive is formed.

A stripe-shaped third end portion 467 provided along the third edge 461c and to be wrapped around and fixed to the positive-electrode side cover 340 includes a third nonadhesive area 467h applied with no adhesive, which extends between the first edge 461a and the second edge 461b. Further, a stripe-shaped fourth end portion 469 provided along the fourth edge 461d and to be wrapped around and fixed to the negative-electrode side cover 350 includes a fourth nonadhesive area 469h applied with no adhesive, which extends between the first edge 461a and the second edge 461b. The remaining portions are applied with adhesive.

In the fourth embodiment, the seal member 460 is formed in such a manner that this sheet-like seal member 461 is wrapped around the yet-to-be-sealed battery module so that the second end portion 465 overlaps the first end portion 463, and they are hermetically fixed by welding to each other in a sleeve shape (see FIGS. 8 to 13). To be more specific, of the second end portion 465, the second nonadhesive area 465h applied with no adhesive is overlapped on the first end portion 463 from outside and fixed thereto by welding without interposing adhesive.

In the third embodiment, the first end portion 363 and the second end portion 365 of the sheet-like seal member 361 are fixed to each other by use of adhesive. However, if an electrolyte leaks from each cell 311, penetrating into this fixed portion, the adhesive is likely to change in quality, deteriorating adhesive force, because the electrolyte is alkaline. This may cause the fixed portion to come unstuck.

In the fourth embodiment, on the other hand, the first end portion 463 and the second end portion 465 of the sheet-like seal member 461 are fixed to each other by welding. Accordingly, even when the electrolyte having leaked from each cell 311 reaches the fixed portion, the fixed portion is unlikely to come unstuck, thus achieving improved sealing characteristics. Furthermore, the first end portion 463 and the second nonadhesive area 465h of the second end portion 465 are welded to each other without interposing adhesive. Since this welding can therefore be carried out reliably, the sealing characteristics in this fixed portion can particularly be improved.

In the fourth embodiment, the third end portion 467 (the third nonadhesive area 467h) of the sheet-like seal member 461 forms a first open end portion 460p of the seal member 460, which surrounds the positive-electrode side cover 340 without interposing adhesive and is hermetically fixed by welding to the positive-electrode side cover 340. The fourth end portion 469 (the fourth nonadhesive area 469h) forms a second open end portion 460q of the seal member 460, which surrounds the negative-electrode side cover 350 without interposing adhesive and is hermetically fixed by welding to the negative-electrode side cover 350.

In the third embodiment, the seal member 360 is fixed by use of adhesive to the positive-electrode side cover 340 and the negative-electrode side cover 350. However, as mentioned above, even when an electrolyte leaks from each cell 311 and penetrates into the fixed portion, the adhesive is likely to change in quality, deteriorating adhesive force, which may cause the fixed portion to come unstuck.

In the fourth embodiment, on the other hand, the seal member 460 is fixed by welding to the positive-electrode side cover 340 and the negative-electrode side cover 350. Accordingly, even when the electrolyte having leaked from each cell 311 reaches the fixed portion, the seal member 460 is unlikely to come unstuck, which achieves improved sealing characteristics. Further, the seal member 460 is welded without interposing adhesive to the positive-electrode side cover 340 and the negative-electrode side cover 350. Since this welding can therefore be carried out reliably, the sealing characteristics in this fixed portion can particularly be improved.

Figure 10:
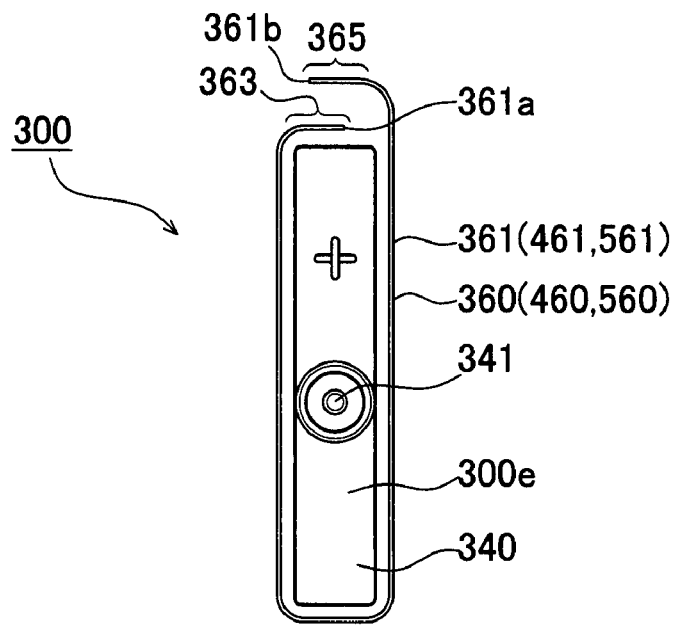
FIG. 10 is a plan view of the battery module in the third embodiment, viewed from a first end wall side thereof.
Figure 11:
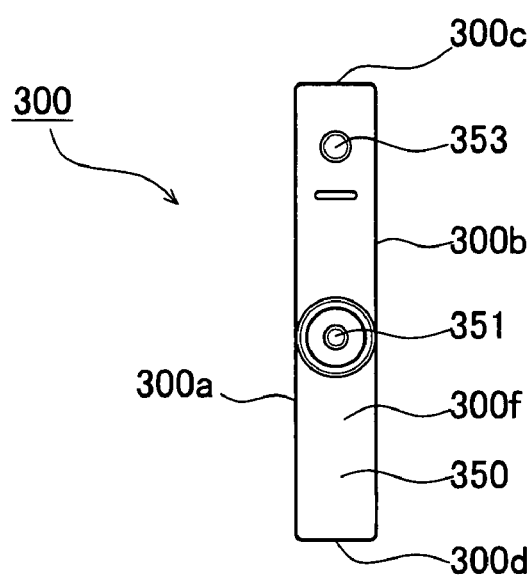
FIG. 11 is a plan view of the battery module in the third embodiment, viewed from a second end wall side thereof.

The following description will be made on a producing method of the battery module in the fourth embodiment (see FIG. 10 and others). Firstly, the yet-to-be-sealed battery module is produced in the same manner as in the third embodiment. In the sealing process, subsequently, the sheet-like seal member 461 is wrapped around the yet-to-be-sealed battery module to hermetically seal the battery module. Specifically, the sheet-like seal member 461 is arranged so that its first edge 461a and second edge 461b extend in the cell arrangement direction. Then, the first end portion 463 of the sheet-like seal member 461 is attached to the upper surface of the gas duct member 330. After that, the sheet-like seal member 461 is wrapped around the yet-to-be-sealed battery module about the axis in the cell arrangement direction while adhering to the module.

At that time, as in the third embodiment, the sheet-like seal member 461 is attached to each cell case 313 of the cell group 310 and the gas duct member 330. In the fourth embodiment, the third end portion 467 of the sheet-like seal member 461 is formed as the third nonadhesive area 467h with no adhesive. Accordingly, the third end portion 467 is wrapped around the positive-electrode side cover 340 but does not adhere to the positive-electrode side cover 340. The fourth end portion 469 is also formed as the fourth nonadhesive area 469h with no adhesive. Accordingly, the fourth end portion 469 is wrapped around the negative-electrode side cover 350 but does not adhere to the negative-electrode side cover 350. Then, the second end portion 465 of the sheet-like seal member 461 is overlapped on the first end portion 463 from outside, and the second adhesive area 466 of the second end portion 465 is attached to the first end portion 463 for temporal fixing.

Subsequently, the second nonadhesive area 465h of the second end portion 465 is hermetically fixed by welding to the first end portion 463. The third end portion 467 (the third nonadhesive area 467h) is hermetically fixed by welding to the positive-electrode side cover 340 and the fourth end portion 469 (the fourth nonadhesive area 469h) is hermetically fixed by welding to the negative-electrode side cover 350. Thus, the battery module in the fourth embodiment is completed.

In the fourth embodiment, as mentioned above, the seal member whose second end portion 465 is applied with no adhesive, forming the second nonadhesive area 465h, is used as the sheet-like seal member 461. In the sealing process, furthermore, the second nonadhesive area 465h is hermetically fixed by welding to the first end portion 463. Accordingly, the second nonadhesive area 465h of the second end portion 465 and the first end portion 463 can be fixed to each other by only welding without interposing adhesive. Thus, the second end portion 465 and the first end portion 463 can surely be fixed to each other.

Furthermore, the sheet-like seal member 461 includes the second adhesive area 466 applied with adhesive in the second end portion 465 so that this second adhesive area 466 is attached to the first end portion 463 for temporal fixing in the sealing process and then the second nonadhesive area 465h of the second end portion 465 is welded to the first end portion 463. Accordingly, the second nonadhesive area 465h of the second end portion 465 is easy to be positioned in place for welding and an appropriate portion can surely be welded.

Furthermore, the sheet-like seal member 461 is configured so that the third end portion 467 is formed as the third nonadhesive area 467h with no adhesive and also the fourth end portion 469 is formed as the fourth nonadhesive area 469h with no adhesive. In the sealing process, this third nonadhesive area 467h is hermetically fixed by welding to the positive-electrode side cover 340 and this fourth nonadhesive area 469h is hermetically fixed by welding to the negative-electrode side cover 350. Accordingly, the third end portion 467 and the positive-electrode side cover 340, and, the fourth end portion 469 and the negative-electrode side cover 350, can be fixed only by welding without interposing adhesive. Thus, the third end portion 467 and the positive-electrode side cover 340, and, the fourth end portion 469 and the negative-electrode side cover 350, can be surely fixed, respectively.

As for the rest, similar parts to those in the third embodiment provide similar operations and effects to those in the third embodiment.

Fifth Embodiment

Figure 16:
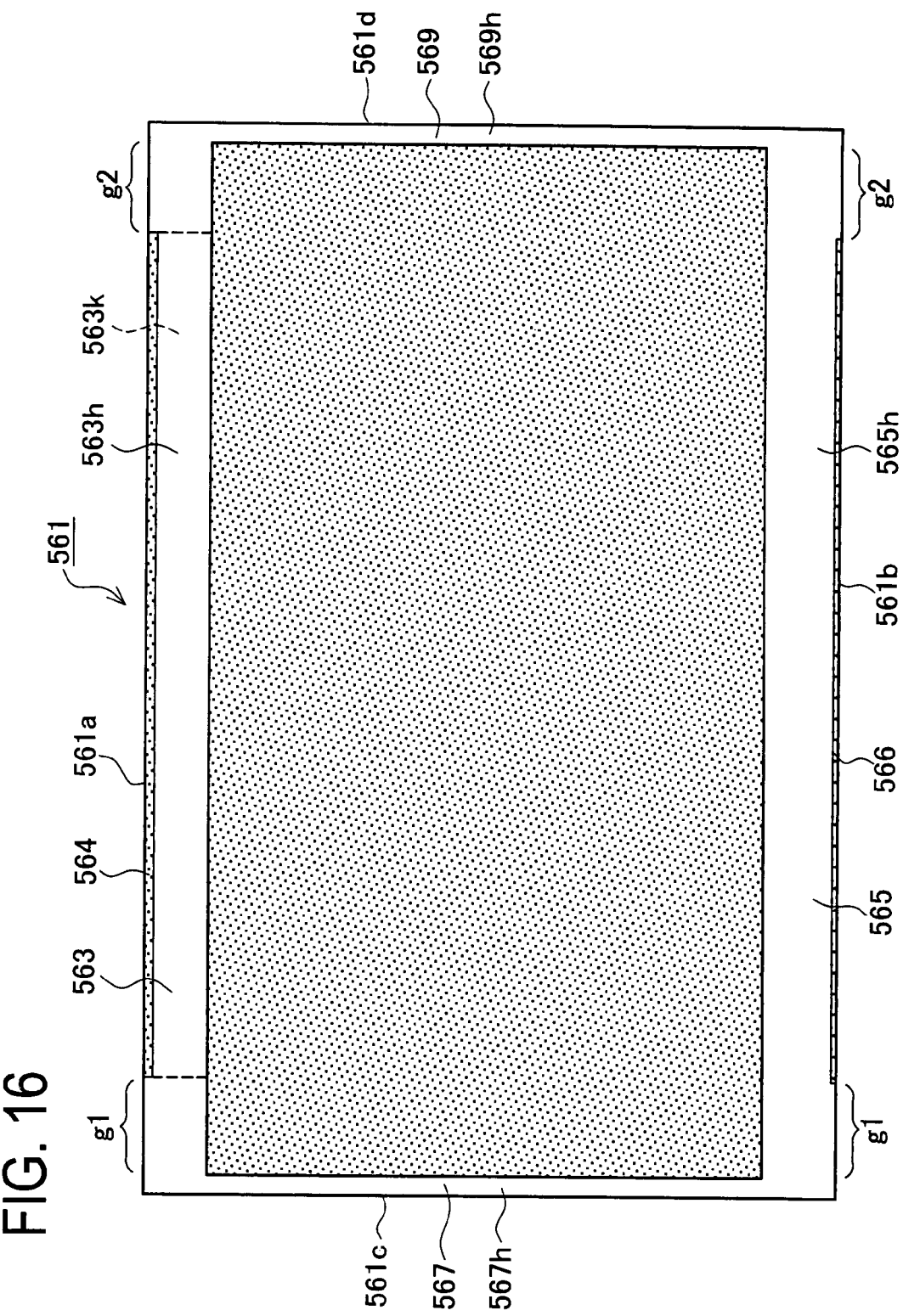
FIG. 16 is an explanatory view showing a sheet-like seal member to be used in production of the battery module in a fifth embodiment.

A fifth embodiment will be explained below. The explanation of similar parts to those in the third embodiment is omitted or simplified. In the fifth embodiment, a sheet-like seal member 561 constituting a seal member 560 is different from the sheet-like seal members 361 and 461 in the third and fourth embodiments. The others are basically similar to those in the third and fourth embodiments. FIG. 16 shows the sheet-like seal member 561 used in a battery module in the fifth embodiment.

This sheet-like seal member 561 is similarly of a rectangular shape having opposite first edge 561a and second edge 561b, and opposite third edge 561c and fourth edge 561d. This sheet-like seal member 561 is also a sheet having a thickness of about 100 μm and applied with adhesive, but it partly includes an area applied with no adhesive.

To be concrete, a stripe-shaped first end portion 563 provided along the first edge 561a and to be placed on the upper surface and the side surfaces of the gas duct member 330 includes a first nonadhesive area 563h applied with no adhesive, which extends between the third edge 561c and the fourth edge 561d. In the first end portion 563, closer to the first edge 561a than the first nonadhesive area 563h, a first adhesive area 564 applied with adhesive is formed. This first adhesive area 564 is provided excepting a first predetermined range g1 (a range of 50 mm or less) of the first end portion 563 which is to be placed on the gas duct member 330 on the positive-electrode side cover 340 side and a second predetermined range g2 (a range of 50 mm or less) of same on the negative-electrode side cover 350 side.

A stripe-shaped second end portion 565 provided along the second edge 561b and to be placed on the upper surface and the side surfaces of the gas duct member 330 and overlapped on the first end portion 563 from outside includes a second nonadhesive area 565h applied with no adhesive, which extends between the third edge 561c and the fourth edge 561d. In the second end portion 565, closer to the second edge 561b than the second nonadhesive area 565h, a stripe-shaped second adhesive area 566 applied with adhesive is formed. This second adhesive area 566 is provided, as with the first adhesive area 564, excepting a first predetermined range g1 (a range of 50 mm or less) of the second end portion 566 which is to be placed on the gas duct member 330 on the positive-electrode side cover 340 side and a second predetermined range g2 (a range of 50 mm or less) of same on the negative-electrode side cover 350 side.

Figure 9:
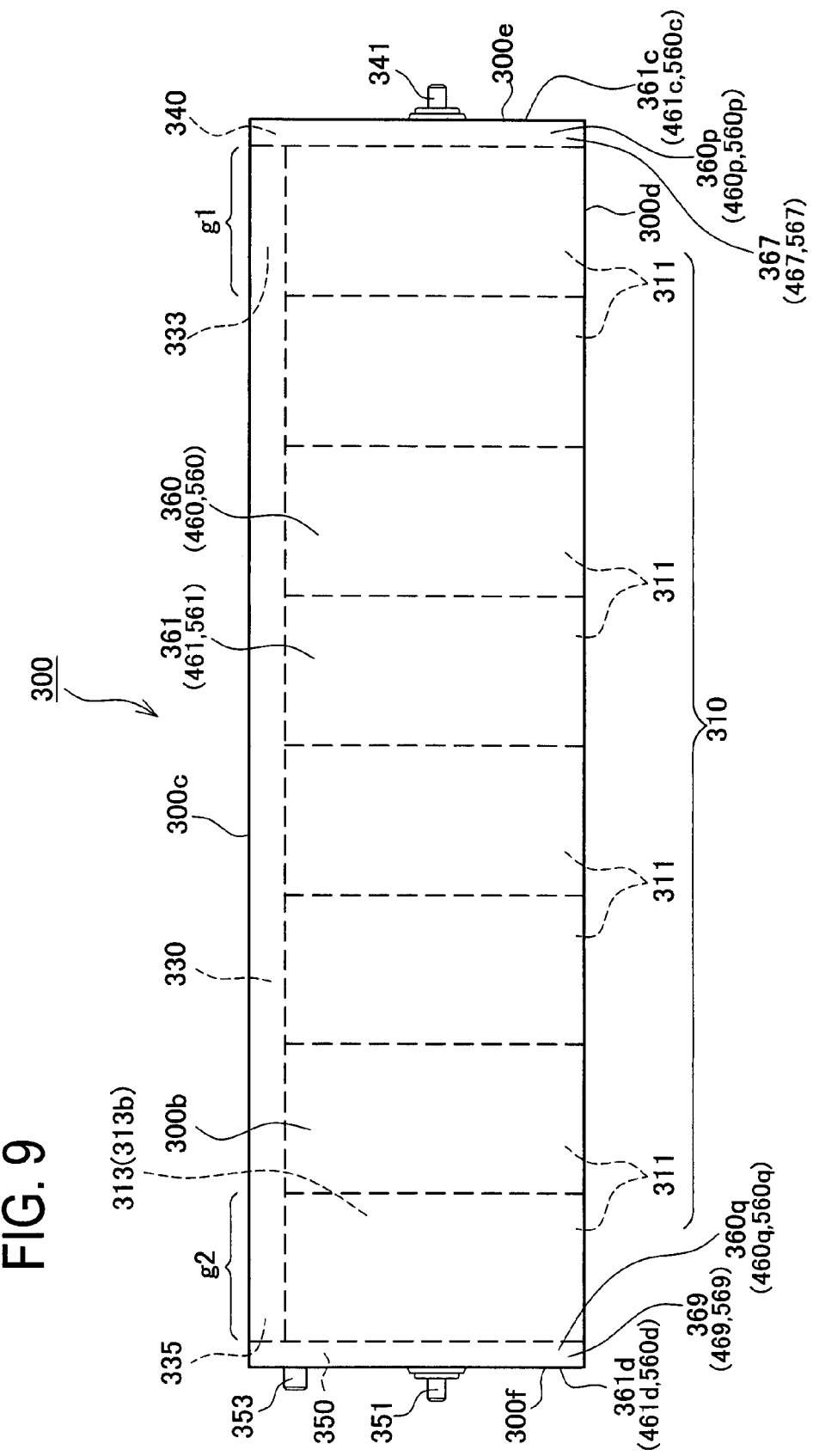
FIG. 9 is a plan view of the battery module in the third embodiment, viewed from a second long side wall side thereof.
Figure 12:
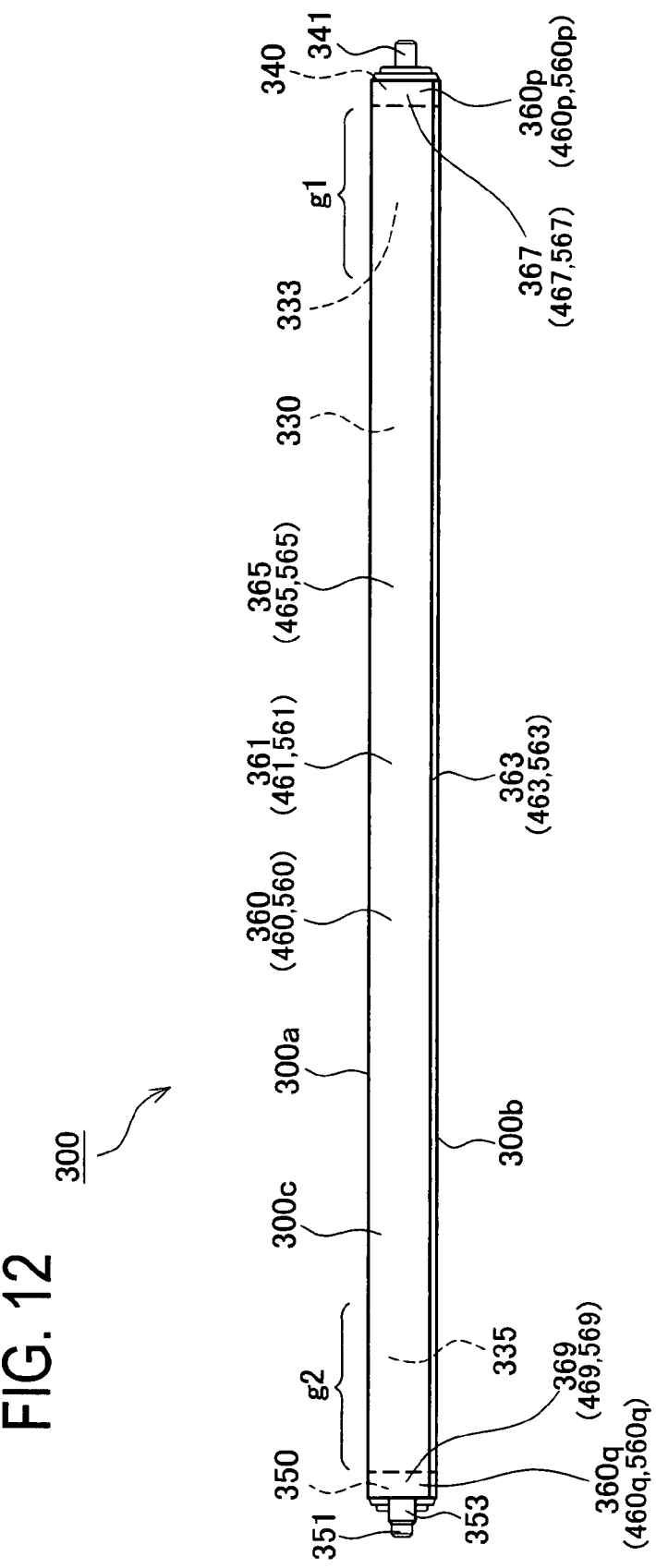
FIG. 12 is a plan view of the battery module in the third embodiment, viewed from a first short side wall side thereof.

Accordingly, the sheet-like seal member 561 (the seal member 560) is not fixed to a positive side portion 333 of the gas duct member 330, including a predetermined range g1 (a range of 50 mm or less) inward in the cell arrangement direction from the positive-electrode side cover 340, and a negative side portion 335 of the gas duct member 330, including a predetermined range g2 (a range of 50 mm or less) inward in the cell arrangement direction from the negative-electrode side cover 350 (see FIGS. 9 and 12).

Further, a stripe-shaped third end portion 567 provided along the third edge 561c and to be wrapped around and fixed to the positive-electrode side cover 340 includes a third nonadhesive area 567 applied with no adhesive between the first edge 561a and the second edge 561b. Further, a stripe-shaped fourth end portion 569 provided along the fourth edge 561d and to be wrapped around and fixed to the negative-electrode side cover 350 and fixed thereto is also formed with a fourth nonadhesive area 569h applied with no adhesive between the first edge 561a and the second edge 561b. The remaining portions are applied with adhesive.

In the fifth embodiment, the seal member 560 is formed in such a manner that the sheet-like seal member 561 is wrapped around the yet-to-be-sealed battery module so that part of the second end portion 565 overlaps part of the first end portion 563, and they are hermetically fixed by welding to each other in a sleeve shape (see FIGS. 8 to 12). To be more specific, of the second end portion 565, part of the second nonadhesive area 565h applied with no adhesive on the second edge 561b side is overlapped on part of the first end portion 563 on the first edge 561a side from outside and fixed by welding without interposing adhesive. Accordingly, the sealing characteristics of this welded portion can be enhanced particularly as in the fourth embodiment.

In the fifth embodiment, as in the fourth embodiment, the third end portion 567 (the third nonadhesive area 567h) of the sheet-like seal member 561 forms a first open end portion 560p of the seal member 560, which surrounds the positive-electrode side cover 340 and is hermetically fixed by welding to the positive-electrode side cover 340 without interposing adhesive. The fourth end portion 569 (the fourth nonadhesive area 569h) forms a second open end portion 560q of the seal member 560, which surrounds the negative-electrode side cover 350 and is hermetically fixed by welding to the negative-electrode side cover 350 without interposing adhesive. Thus, the sealing characteristics of those welded portions can be enhanced particularly.

Furthermore, in the fifth embodiment, the seal member 560 is not fixed to the first-side-cover-side portion 333 and the second-side-cover-side portion 335 of the gas duct member 330 (see FIGS. 9 and 12). In other words, the first-side-cover-side portion 333 and the second-side-cover-side portion 335 can be moved freely without being restricted by the seal member 560. Accordingly, even when the gas duct member 330 thermally shrinks under low temperatures, causing gaps between the gas duct member 330 and the positive-electrode and negative-electrode side covers 340 and 350, the portions of the seal member 560 corresponding to the gaps will not strongly be stretched. Specifically, when the gas duct member 330 thermally shrinks, not only the portions of the seal member 560 corresponding to the above gaps but also the portions corresponding to the first predetermined range g1 and the second predetermined range g2 are together stretched to entirely extend. Thus, strong stretching stress will not be exerted on only the portions corresponding to the gaps. This makes it possible to prevent cracks or other defects from occurring in the seal member 560. In the fifth embodiment, particularly, the seal member 560 is fixed to the gas duct member 330 through only the first adhesive area 564 having a very narrow area. Even when the gas duct member 330 thermally shrinks, cracks or other defects will be unlikely to occur in the seal member 560 especially.

In the fifth embodiment, the first nonadhesive area 563h is formed from the third edge 561c to the fourth edge 561d. As a boundary shown by broken lines in FIG. 16, however, a central area 563k excepting the first predetermined range g1 and the second predetermined range g2 may be applied with adhesive. Even in this case, when the gas duct member 330 thermally shrinks, not only the portions corresponding to the aforementioned gaps but also the portions corresponding to the first predetermined range g1 and the second predetermined range g2 will be stretched, so that the seal member 560 is entirely extended. Thus, strong stretching stress will not be exerted on only the portions corresponding to the gaps. This makes it possible to prevent cracks or other defects from occurring in the sealing member 560.

The following description will be made on a producing method of the above battery module in the fifth embodiment. Firstly, the yet-to-be-sealed battery module is produced in the same manner as in the third embodiment. In the sealing process, subsequently, the sheet-like seal member 561 is wrapped around the yet-to-be-sealed battery module to hermetically seal the battery module. Specifically, the sheet-like seal member 561 is arranged so that its first edge 561a and second edge 561b extend in the cell arrangement direction. Then, of the first end portion 563 of the sheet-like seal member 561, the first adhesive area 564 is attached to part of the upper surface of the gas duct member 330 for temporal fixation. After that, the sheet-like seal member 561 is wrapped around the yet-to-be-sealed battery module about the axis in the cell arrangement direction while adhering to the module.

At that time, the sheet-like seal member 561 is attached to each cell case 313 of the cell group 310. In the fifth embodiment, however, excepting the first adhesive area 564 of the first end portion 563, the sheet-like seal member 561 does not adhere to the gas duct member 330. This is because, except the first adhesive area 564, the portions of the sheet-like seal member 561 to be placed on the upper surface and side surfaces of the gas duct member 330 are not applied with adhesive as mentioned above.

As in the fourth embodiment, the third end portion 567 of the sheet-like seal member 561 is wrapped around the positive-electrode side cover 340 but does not adhere to the positive-electrode side cover 340 because the third end portion 567 is formed as the third nonadhesive area 567h. Similarly, the fourth end portion 569 is wrapped around the negative-electrode side cover 350 but does not adhere to the negative-electrode side cover 350 because the fourth end portion 569 is formed as the nonadhesive area 569h with no adhesive. After that, the second end portion 565 of the sheet-like seal member 561 is overlapped on the first end portion 563 from outside and the second adhesive area 566 of the second end portion 565 is attached to the first end portion 563 for temporal fixation.

Subsequently, as in the fourth embodiment, the second nonadhesive area 565h of the second end portion 565 is hermetically fixed by welding to the first end portion 563. Further, the third end portion 567 (the third nonadhesive area 567h) is hermetically fixed by welding to the positive-electrode side cover 340 and the fourth end portion 569 (the fourth nonadhesive area 569h) is hermetically fixed by welding to the negative-electrode side cover 350. Thus, the battery module in the fifth embodiment is completed.

It is to be noted that similar portions to those in the above third and fourth embodiments provide similar operations and effects to those in the third and fourth embodiments.

Sixth Embodiment

Figure 17:
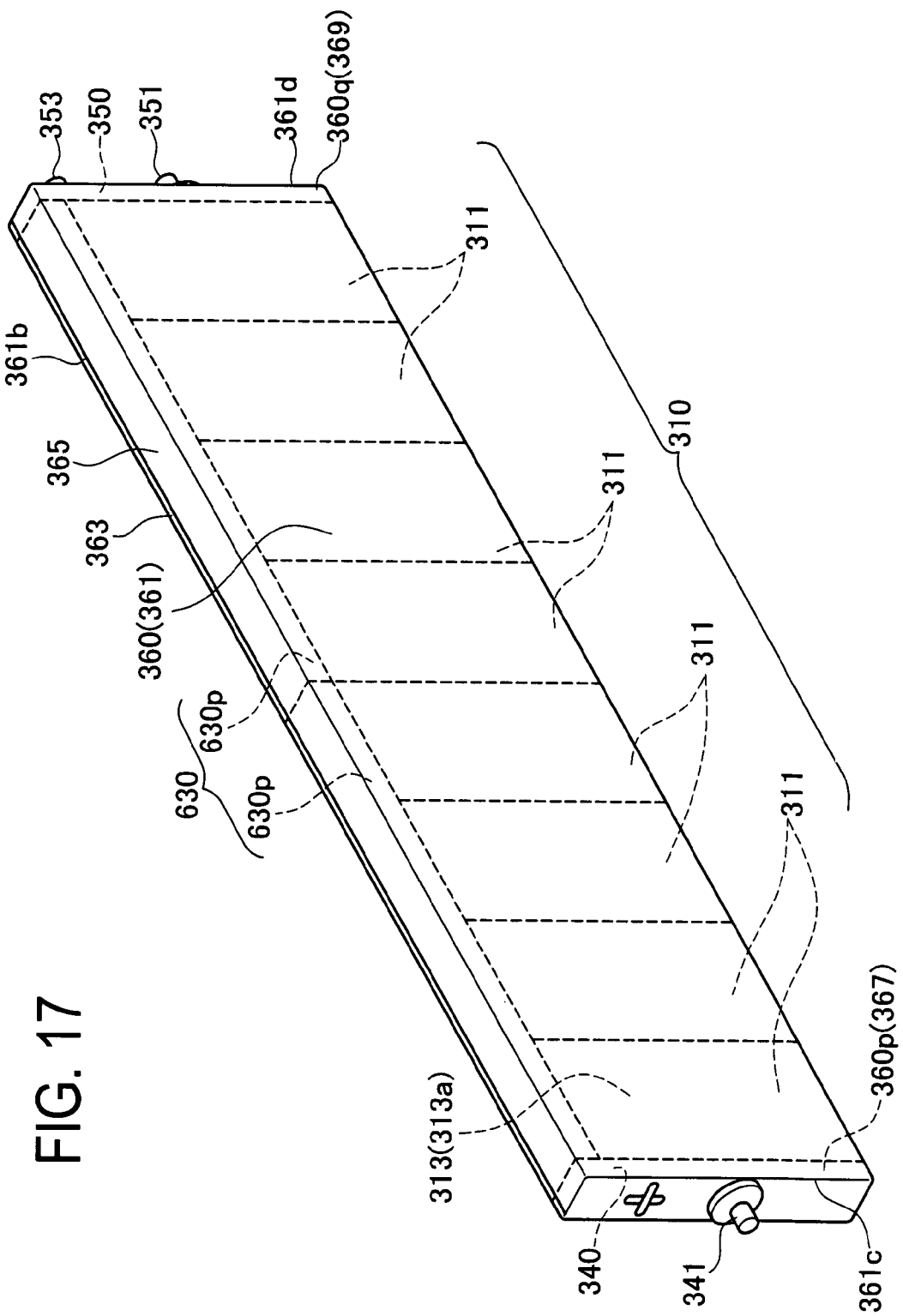
FIG. 17 is a perspective view of a battery module in a sixth embodiment.

A sixth embodiment will be explained below. The explanation of similar parts to those in the third to fifth embodiments is omitted or simplified. FIG. 17 shows a battery module in the sixth embodiment. In the sixth embodiment, a gas duct member 630 constituting the battery module is different from the gas duct members 330 in the aforementioned third to fifth embodiments. The others are basically similar to those in the third embodiment.

In the sixth embodiment, the gas duct member 630 is comprised of a plurality of (two) sub gas-duct members 630p arranged in the cell arrangement direction. Each sub gas-duct member 630p corresponds to half of the gas duct member 330 in the third to fifth embodiment when cut at the center in the cell arrangement direction. This configuration of the gas duct member 630 allows the sub gas-duct members 630p to thermally shrink separately even when the gas duct member 630 thermally shrinks, for example, under low temperatures. This makes it possible to prevent a large gap from becoming generating between the gas duct member 630 and the positive-electrode and negative-electrode side covers 340 and 350. Accordingly, the portions of the seal member 360 around the boundary between the positive-electrode side cover 340 and the gas duct member 330 and between the negative-electrode side cover 350 and the gas duct member 330 will not receive so strong stretching stress. This makes it possible to prevent cracks or other defects from occurring in the portions of the seal member close to the boundary.

As for the rest, similar parts to those in the third to fifth embodiments provide similar operations and effects to those in the third to fifth embodiments.

Seventh Embodiment

Figure 18:
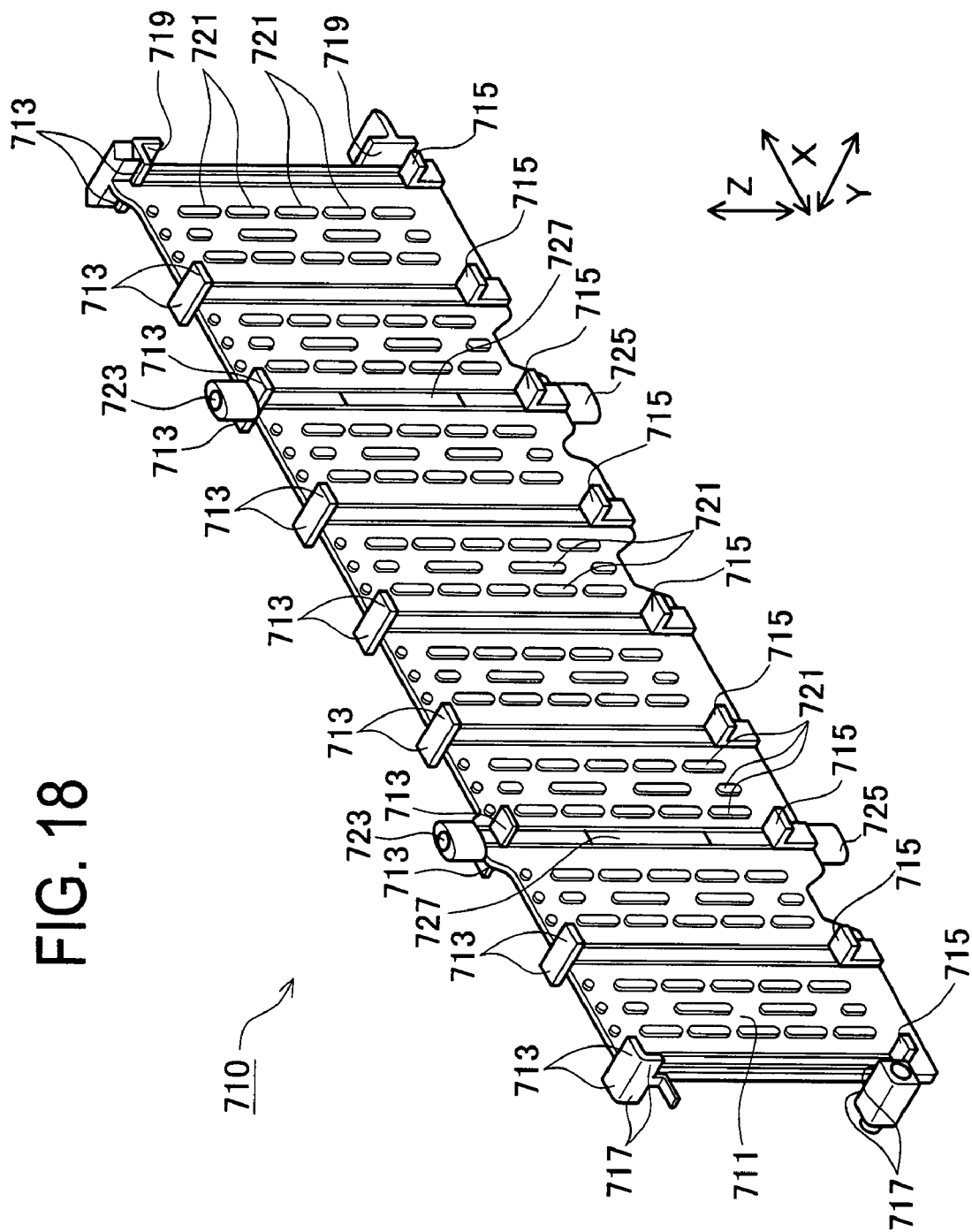
FIG. 18 is a perspective view of a holding spacer of a battery pack in a seventh embodiment.
Figure 19:
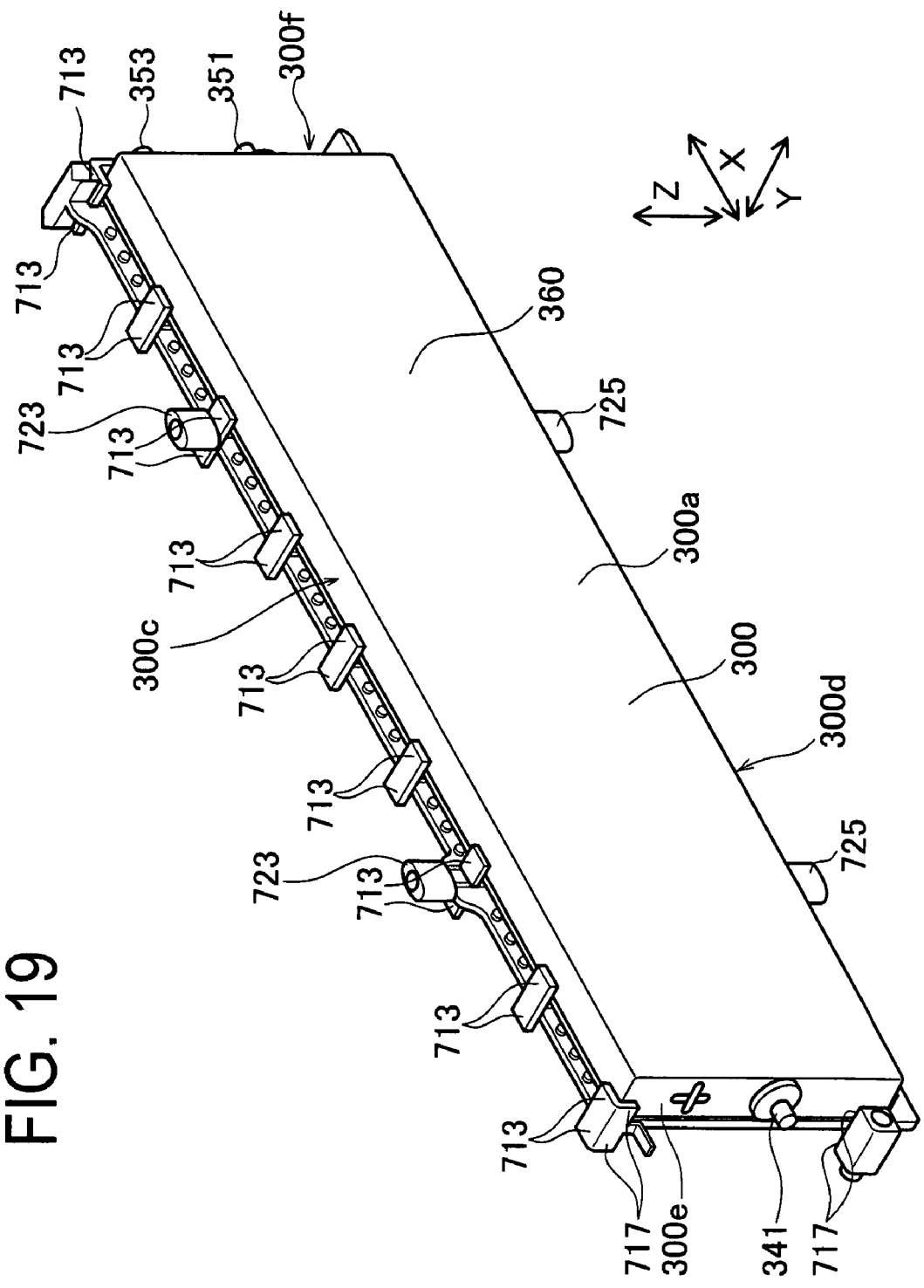
FIG. 19 is a perspective view of the battery pack in the seventh embodiment, showing a configuration that the battery module is mounted in the holding spacer.
Figure 20:
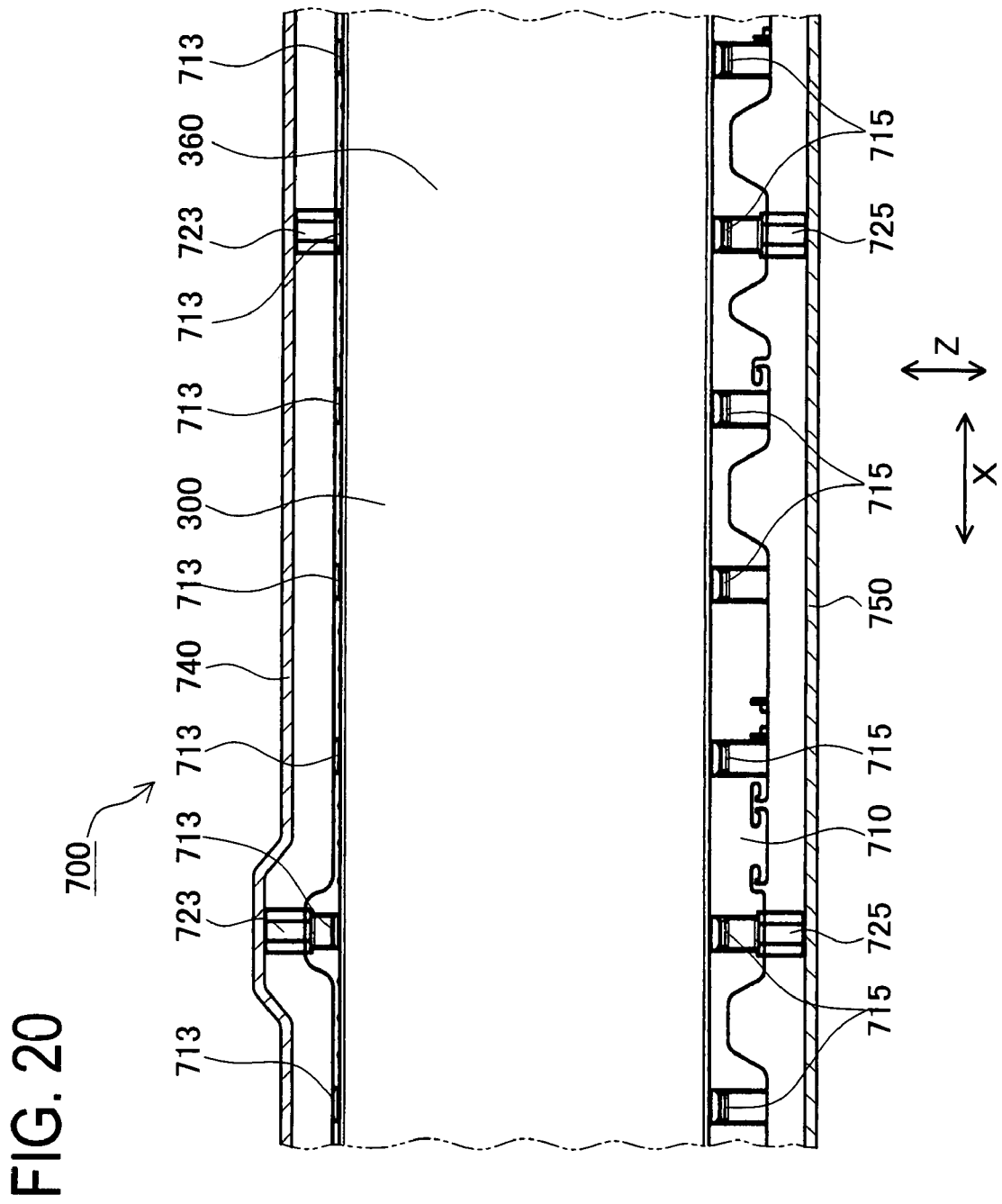
FIG. 20 is an explanatory view showing the battery pack in the seventh embodiment.

A seventh embodiment will be explained below. The explanation of similar parts to those in any one of the third to sixth embodiments is omitted or simplified. FIG. 18 shows a holding spacer 710 constituting a battery pack 700 in the seventh embodiment. FIG. 19 shows a configuration that the battery module 300 in the third embodiment is mounted in the holding spacer 710. FIG. 20 shows the battery pack 700 in the seventh embodiment. In FIGS. 18 to 20, it is assumed that in the completed battery pack, the arranging direction of the cells 311 is a cell arrangement direction X, the arranging direction of battery module 300 is a module arrangement direction Y, and the direction perpendicular to those is a vertical direction Z.

This battery pack 700 is a secondary battery (e.g. a nickel-metal hydride storage battery) to be used as a power source for electric vehicles and hybrid electric vehicles. The battery pack 700 is comprised of a plurality of (e.g. six) the battery modules 300 in the third embodiment. Instead of the battery modules 300, the battery modules in the fourth, fifth, or sixth embodiment may be mounted. Disposed in a space between the adjacent battery modules 300 is the holding spacer 710 which holds the battery modules 300. Those battery modules 300 and the holding spacers 710 are supported by a nearly plate-shaped first spacer supporting member 740 and a nearly plate-shaped second spacer supporting member 750. Furthermore, the battery modules 300, holding spacers 710, first and second spacer supporting members 740 and 750 are together bound into an integral form with end plates and a binding band not shown.

Of them, the battery module 300 is as explained in the third embodiment.

The holding spacer 710 is made of electrical insulating resin in integral form excepting a first elastic member 723, a second elastic member 725, and a plate-like rubber member 727. The holding spacer 710 is placed in the space between the battery modules 300 to hold those battery modules 300 and form a cooling path between each battery module 300 and the holding spacer 710 for allowing a cooling medium to pass therethrough.

To be more specific, as shown in FIG. 18 and others, the holding spacer 710 includes a spacer body 711 of a nearly plate-like shape, which is directly placed between the battery modules 300. At one end of the spacer body 711 in the vertical direction Z, a plurality of first module supporting parts 713 is provided (nine on each side and eighteen in total) for supporting the first short side wall 300c of the adjacent battery module 300. These first module supporting parts 713 are each formed of a plate shape protruding on both sides in the module arrangement direction Y to be perpendicular to the vertical direction Z. At the other end of the spacer body 711 in the vertical direction Z, a plurality of second module supporting parts 715 is provided (nine on each side and eighteen in total) for supporting the second short side wall 300d of the adjacent battery module 300. Similarly, these second module supporting parts 715 are each formed of a plate shape protruding on both sides in the module arrangement direction Y to be perpendicular to the vertical direction Z. The battery module 300 attached to the holding spacer 710 is placed between those first module supporting parts 713 and second module supporting parts 715 and hence held against movement in the vertical direction Z (see FIG. 19).

Further, as shown in FIG. 18 and others, at one end of the spacer body 711 in the cell arrangement direction X, a plurality of third module supporting parts 717 is provided (two on each side and four in total) for supporting the first end wall 300e of the adjacent battery module 300. Each of these third module supporting parts 717 protrudes on both sides in the module arrangement direction Y. At the other end of the spacer body 711 in the cell arrangement direction, a plurality of fourth module supporting parts 719 is provided (two on each side and four in total) for supporting the second end wall 300f of the adjacent battery module 300. Similarly, each of these fourth module supporting parts 719 protrudes on both sides in the module arrangement direction Y. The battery module 300 mounted in the holding spacer 710 is placed between those third module supporting parts 717 and fourth module supporting parts 719 and hence held against movement in the cell arrangement direction X (see FIG. 19).

As shown in FIG. 18, furthermore, the spacer body 711 is provided with a large number of cooling path forming protrusions 721 to form the cooling path for allowing a cooling medium to pass through between the spacer body 711 and the adjacent first long side wall 300a or second long side wall 300b. Each of these cooling path forming protrusions 721 protrudes in the module arrangement direction Y and extends linearly in the vertical direction Z. The first long side wall 300a or second long side wall 300b of the battery module 300 mounted in the holding spacer 710 is held in contact with the cooling path forming protrusions 721, providing the cooling path between the spacer body 711 and the battery module 300.

Furthermore, at one end of the spacer body 711 in the vertical direction Z, a plurality of (two) first elastic members 723 is provided to be held in contact with the first spacer supporting member 740. Each first elastic member 723 is of an elliptic-cylindrical shape and fixed to the spacer body 711 to protrude in the vertical direction Z as it is fitted on a projection not shown of the spacer body 711 on the upper end side. The first elastic member 723 is made entirely of rubber, which is elastically deformable in the vertical direction Z.

At the other end of the spacer body 711 in the vertical direction Z, a plurality of (two) second elastic members 725 is provided as held in contact with the second spacer supporting member 750. Each second elastic member 725 is similarly of an elliptic-cylindrical shape and fixed to the space body 711 to protrude in the vertical direction Z as it is fitted on a projection not shown of the spacer body 711 on the lower end side. The second elastic member 725 is made entirely of rubber, which is elastically deformable in the vertical direction Z.

In the assembled battery pack 700 (see FIG. 20), the holding spacer 710 is in a state in which the first elastic members 723, having been elastically deformed (elastic compression)

in the vertical direction Z, are in elastic contact under pressure with the first spacer holding member 740, and the second elastic members 725, having been elastically deformed (elastic compression) in the vertical direction Z, are in elastic contact under pressure with the second spacer holding member 750. Thus, the holding spacer 710 is elastically sandwiched between the first and second spacer holding members 740 and 750.

Further, the spacer body 711 is provided with a plurality of plate-like rubber parts 727 (two on each side and four in total). Each plate-like rubber part 727 is of a long rectangular shape extending in the vertical direction Z. The plate-like rubber part 727 is fitted in a rectangular through hole formed in the spacer body 711 to be fixed thereto. The plate-like rubber part 727 is made entirely of rubber, which is elastically deformable in the module arrangement direction Y. The battery module 300 is elastically held in the holding spacer 710 while those plate-like rubber parts 727 are elastically deformed in the module arrangement direction Y when the battery module 300 is mounted in the holding spacer 710 so that the plate-like rubber parts 727 are held in elastic contact under pressure with the first long-side wall 300a or second long-side wall 300b of the battery module 300.

The battery module 300 is inexpensive and capable of preventing gas leakage and electrolyte leakage as mentioned above, so that the battery pack 700 can be achieved at low cost and with high reliability.

The above battery pack 700 is produced in the following manner. Specifically, the battery module 300 is produced in the method described in the third embodiment. On the other hand, the holding spacers 710 are prepared. Each holding spacer 710 may be prepared in such a manner that the rubber first elastic members 723 and second elastic members 725 and the plate-like rubber parts 727 are attached to respective predetermined positions of the resinous spacer body 711. Then, the battery modules 300 are arranged while interposing the holding spacers 710 in respective spaces therebetween. Further, the first spacer supporting member 740 and the second spacer supporting member 750 are arranged and then all of them are bound with the end plates and the band to complete the battery pack 700.

As above, the present invention has been explained referring to the preferred embodiments; however, the present invention is not limited to the above first to seventh embodiment and may be embodied in other specific forms without departing from the spirit or essential characteristics thereof.

INDUSTRIAL APPLICABILITY

According to the present invention, as apparent from the above description, it relates to the battery module provided with a safety valve in each cell and can provide a battery module inexpensive and capable of preventing gas leakage, a battery pack comprising such battery module, and a battery module producing method.

The invention claimed is:

1. A battery module including a plurality of cells each of which is provided with a safety valve on a safety-valve mounting wall of a cell case, wherein
the plurality of cells included in the battery module are arranged so that the safety-valve mounting walls are oriented in the same direction, and
the battery module further includes:
a gas duct member which covers all the safety valves of the plurality of cells included in the battery module, thereby forming a gas discharge path between the gas duct member and the safety-valve mounting walls; and
a seal member for hermetically sealing between at least each cell case and the gas duct member.

2. The battery module set forth in claim 1, wherein the seal member fixes the gas duct member to each cell case.

3. The battery module set forth in claim 1, wherein the seal member also hermetically seals a gap between the adjacent cell cases.

4. The battery module set forth in claim 1, wherein the seal member includes an adhesive tape attached to bridge across at least each cell case and the gas duct member to seal between them.

5. The battery module set forth in claim 1, wherein the seal member is a heat-shrinkable tube in a shrunken state that surrounds the cell cases and the gas duct member and provides mutual pressure contact between the cell cases and the gas duct member.

6. The battery module set forth in claim 1, wherein
each cell case is made of metal in at least part of a case surface,
the seal member has electric insulation characteristics; and
at least the metallic parts of the case surfaces of the plurality of cells included in the battery module are covered by the seal member.

7. The battery module set forth in claim 1, wherein the seal member is a sheet form having a thickness of 0.5 mm or less.

8. The battery module set forth in claim 1, wherein
each cell case is of a rectangular parallelepiped shape, in which the safety-valve mounting wall is rectangular, and
the plurality of cells included in the battery module are arranged so that respective side walls each including a short side of the safety-valve mounting wall and being perpendicular to the safety-valve mounting wall face each other.

9. A battery module comprising:
a cell group in which a plurality of cells each provided with a safety valve in a safety-valve mounting wall of a cell case is arranged in a row so that the safety-valve mounting walls are oriented in the same direction;
a gas duct member placed over the safety valves of the cell group to cover them, thereby forming a gas discharge path between the gas duct member and the safety-valve mounting walls;
a first side cover that covers the cell group and the gas duct member from one ends thereof in a cell arrangement direction;
a second side cover that covers the cell group and the gas duct member from the other ends thereof in the cell arrangement direction and has a gas discharge port communicated with the gas discharge path; and
a seal member that is placed between the first side cover and the second side cover and hermetically surrounds, in a sleeve shape, the cell group and the gas duct member, the seal member including a first open end portion at one end which is hermetically fixed to around the first side cover and a second open end portion at the other end which is hermetically fixed to around the second side cover.

10. The battery module set forth in claim 9, wherein
the first side cover, the second side cover, and the seal member are made of resin respectively,
the first open end portion of the seal member is hermetically fixed by welding to the first side cover, and
the second open end portion of the seal member is hermetically fixed by welding to the second side cover.

11. The battery module set forth in claim 10, wherein
the first open end portion of the seal member is welded to the first side cover without interposing adhesive, and the second open end portion of the seal member is welded to the second side cover without interposing adhesive.

12. The battery module set forth in claim 9, wherein the seal member is formed of a rectangular sheet-like seal member wrapped in a sleeve shape around the cell group and the gas duct member so that a first end portion along a first edge and a second end portion along a second edge opposite the first edge overlap each other, and the first end portion and the second end portion are hermetically fixed to each other.

13. The battery module set forth in claim 12, wherein
the sheet-like seal member is made of resin, and
the seal member is arranged such that the first end portion and the second end portion of the sheet-like seal member are hermetically fixed to each other by welding.

14. The battery module set forth in claim 13, wherein
the first end portion and the second end portion of the seal member are welded to each other without interposing adhesive.

15. The battery module set forth in claim 9, wherein the seal member is in close contact with each cell case of the cell group.

16. The battery module set forth in claim 9, wherein the seal member is unfixed to at least a first-side-cover-side portion of the gas duct member, the portion extending across a first predetermined range from the first side cover in the cell arrangement direction, and a second-side-cover-side portion of the gas duct member, the portion extending across a second predetermined range from the second side cover in the cell arrangement direction.

17. The battery module set forth in claim 9, wherein
the seal member is fixed to the gas duct member from one end to the other in the cell arrangement direction, and
the gas duct member includes a plurality of sub gas-duct parts arranged in the cell arrangement direction.

18. A battery pack comprising one or more battery modules set forth in claim 9.

19. A method for producing a battery module, comprising a sealing step of wrapping a rectangular sheet-like seal member having a first edge and a second edge and a third edge and a fourth edge around a yet-to-be-sealed battery module to hermetically seal it, the yet-to-be-sealed battery module comprising:
a cell group in which a plurality of cells each provided with a safety valve in a safety-valve mounting wall of a cell case is arranged in a row so that the safety-valve mounting walls are oriented in the same direction;
a gas duct member placed over the safety valves of the cell group to cover them, thereby forming a gas discharge path between the gas duct member and the safety-valve mounting walls;
a first side cover that covers the cell group and the gas duct member from one ends thereof in a cell arrangement direction;
a second side cover that covers the cell group and the gas duct member from the other ends thereof in the cell arrangement direction and has a gas discharge port communicated with the gas discharge path; and
wherein the sealing step includes:
placing the sheet-like seal member so that the first edge and the second edge extend along the cell arrangement direction;
wrapping the sheet-like seal member around the yet-to-be-sealed battery module so that the second end portion along the second edge overlaps the first end portion along the first edge from outside while the third end portion along the third edge surrounds the first side cover and the fourth end portion along the fourth edge surrounds the second side cover;
hermetically fixing the second end portion to the first end portion, forming the sheet-like seal member in a sleeve shape;
hermetically fixing the third end portion to the first side cover; and
hermetically fixing the fourth end portion to the second side cover.

20. The battery module producing method set fourth in claim 19, wherein
the sheet-like seal member is a full adhesive sheet-like seal member whose entire surface is applied with adhesive, and
the sealing step includes:
hermetically fixing by adhesion the second end portion to the first end portion;
hermetically fixing by adhesion the third end portion to the first side cover; and
hermetically fixing by adhesion the fourth end portion to the second side cover.

21. The battery module producing method set fourth in claim 19, wherein
the sheet-like seal member is made of resin and the second end portion includes a second nonadhesive area which extends between the third edge and the fourth edge and is applied with no adhesive, and
the sealing step includes hermetically fixing by welding the second nonadhesive area of the second end portion to the first end portion.

22. The battery module producing method set fourth in claim 21, wherein
the sheet-like seal member includes a second adhesive area applied with adhesive in the second end portion closer to the second edge than the second nonadhesive area, and
the sealing step includes temporarily fixing by adhesion the second adhesive area of the second end portion to the first end portion, and then welding the second nonadhesive area of the second end portion to the first end portion.

23. The battery module producing method set fourth in claim 19, wherein
the sheet-like seal member is made of resin,
the third end portion includes a third nonadhesive area applied with no adhesive, extending between the first edge and the second edge,
the fourth end portion includes a fourth nonadhesive area applied with no adhesive, extending between the first edge and the second edge, and
the sealing step further includes hermetically fixing by welding the third nonadhesive area of the third end portion to the first side cover, and hermetically fixing by welding the fourth nonadhesive area of the fourth end portion to the second side cover.

24. A battery pack comprising one or more battery modules set forth in claim 1.

* * * * *